US012659307B2

(12) United States Patent　　　　　(10) Patent No.:　　US 12,659,307 B2

O'Donovan et al.　　　　　　　　　　(45) Date of Patent:　　　　Jun. 16, 2026

(54) NETWORK AUTHENTICATION SERVICE SECURITY

(71) Applicant: Microsoft Technology Licensing, LLC, Redmond, WA (US)

(72) Inventors: Sinead O'Donovan, Seattle, WA (US); Avraham Carmon, Hofit (IL); Ashish Jain, Bellevue, WA (US); Shahzad Ahmed Khalid, San Ramon, CA (US); Mordhai Gendelman, Ramat-Gan (IL); Or Moran, New York, NY (US); Navyatha Beesetti, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 180 days.

(21) Appl. No.: 18/759,568

(22) Filed: Jun. 28, 2024

(65) Prior Publication Data

US 2026/0006018 A1　　　Jan. 1, 2026

(51) Int. Cl.
H04L 9/40　　　　　(2022.01)

(52) U.S. Cl.
CPC ............................... H04L 63/0807 (2013.01)

(58) Field of Classification Search
CPC .................................................... H04L 63/0807
See application file for complete search history.

(56) References Cited

U.S. PATENT DOCUMENTS

| | | | | |
|---|---|---|---|---|
| 2013/0227291 A1* | 8/2013 | Ahmed | ............... | H04L 63/0884 |
| | | | | 713/168 |
| 2020/0076794 A1* | 3/2020 | De Boer | ............... | H04L 9/3213 |
| 2021/0135873 A1* | 5/2021 | Atiya | ................... | H04L 63/0853 |
| 2021/0288808 A1* | 9/2021 | Bahety | ................. | H04L 9/3247 |
| 2022/0150066 A1* | 5/2022 | Sugarev | ............... | H04L 9/3213 |
| 2023/0163969 A1* | 5/2023 | Sugarev | ............... | H04L 9/3213 |
| | | | | 713/159 |
| 2023/0198974 A1* | 6/2023 | Chung | ................... | G06F 21/78 |
| | | | | 726/4 |

OTHER PUBLICATIONS

Neuman et al., "The Kerberos Network Authentication Service (V5)", Jul. 2005. (Year: 2005).*

(Continued)

*Primary Examiner* — Yonas A Bayou

(57)　　　　　　ABSTRACT

Some embodiments provide or utilize technology which increases the security of network authentication operations, such as Kerberos operations, New Technology LAN Manager operations, or other network authentication operations which utilize security tickets or security tokens or both. In some embodiments, a user machine (also known as a client machine) receives an authentication data structure (ADS) which includes one or more security tickets or security tokens or both. Embodiments constrain the ADS according to at least one security requirement, such as a volatile-memory-only constraint, a secured-memory-only constraint, or a multilayer encryption constraint. Embodiments also transmit the ADS from the machine as a part of performing the network authentication service. Some embodiments inhibit virtual memory, or memory dumping, or both. Some embodiments bind the ADS to the user machine, and some embodiments limit ADS usage counts.

20 Claims, 3 Drawing Sheets

(56)                    References Cited

OTHER PUBLICATIONS

"What Is Zero Trust Network Access (ZTNA)?", retrieved from << https://www.vmware.com/topics/glossary/content/zero-trust-network-access-ztna.html#:~: text=Zero%20Trust%20Network%20Access%20(ZTNA)%20is%20an%20IT%20security%20solution, clearly%20defined%20access%20control%20policies. >>, No. later than Oct. 3, 2023, 2 pages.

Sinead O'Donovan, "Microsoft Entra Expands into Security Service Edge with Two New Offerings", retrieved from << https://techcommunity.microsoft.com/t5/microsoft-entra-azure-ad-blog/microsoft-entra-expands-into-security-service-edge-with-two-new/ba-p/3847829 >>, Jul. 11, 2023, 10 pages.

"DNS flows", retrieved from << https://doc.sophos.com/central/ZTNA/startup/en-us/setup/DNSFlows/index.html >>, Jun. 13, 2022, 4 pages.

"Moving the U.S. Government Toward Zero Trust Cybersecurity Principles", retrieved from << https://www.whitehouse.gov/wp-content/uploads/2022/01/M-22-09.pdf >>, Jan. 26, 2022, 29 pages.

"Split-horizon DNS", retrieved from << https://en.wikipedia.org/wiki/Split-horizon_DNS >>, May 11, 2023, 3 pages.

"Virtual private network", retrieved from << https://en.wikipedia.org/wiki/Virtual_private_network >>, Oct. 19, 2023, 12 pages.

"Configure authentication session management with Conditional Access", retrieved from << https://learn.microsoft.com/en-us/entra/identity/conditional-access/howto-conditional-access-session-lifetime >>, Oct. 23, 2023, 10 pages.

"Microsoft Defender for Endpoint", retrieved from << https://learn.microsoft.com/en-us/mem/configmgr/protect/deploy-use/defender-advanced-threat-protection >>, Aug. 10, 2023, 19 pages.

"Microsoft Defender for Office 365", retrieved from << https://www.microsoft.com/en-us/security/business/siem-and-xdr/microsoft-defender-office-365 >>, No. later than Oct. 24, 2023, 5 pages.

"Microsoft Intune securely manages identities, manages apps, and manages devices", retrieved from << https://learn.microsoft.com/en-us/mem/intune/fundamentals/what-is-intune >>, Sep. 5, 2023, 11 pages.

"Certificate revocation", retrieved from << https://en.wikipedia.org/wiki/Certificate_revocation >>, Sep. 9, 2023, 10 pages.

"Continuous access evaluation", retrieved from << https://learn.microsoft.com/en-us/entra/identity/conditional-access/concept-continuous-access-evaluation >>, Oct. 23, 2023, 12 pages.

"Lifetime of Kerberos tickets", retrieved from << https://stackoverflow.com/questions/14682153/lifetime-of-kerberos-tickets >>, Feb. 4, 2013, 3 pages.

"Implications of securing data in RAM", retrieved from << https://security.stackexchange.com/questions/16782/implications-of-securing-data-in-ram >>, Sep. 29, 2020, 6 pages.

"Is it possible to use Kerberos for SSO in a SaaS application?", retrieved from << https://security.stackexchange.com/questions/230175/is-it-possible-to-use-kerberos-for-sso-in-a-saas-application >>, Apr. 27, 2020, 2 pages.

"Extend SSE Beyond Your Users", retrieved from << https://www.zscaler.com/products-and-solutions/security-service-edge-sse >>, no later than May 28, 2024, 13 pages.

"Kerberos (protocol)", retrieved from << https://en.wikipedia.org/wiki/Kerberos_(protocol) >>, May 7, 2024, 10 pages.

"The Kerberos Network Authentication Service (V5)", retrieved from << https://datatracker.ietf.org/doc/html/rfc4120 >>, no later than Jul. 31, 2005, 144 pages.

"Where are Kerberos tickets stored on the local system?", retrieved from << https://brainly.com/question/44247040 >>, Dec. 10, 2023, 7 pages.

Sagar Sharma, "Everything Essential About the tmp Directory in Linux", retrieved from << https://linuxhandbook.com/tmp-directory/ >>, May 24, 2024, 8 pages.

"Credential cache", retrieved from << https://web.mit.edu/kerberos/krb5-1.12/doc/basic/ccache_def.html >>, no later than Dec. 31, 2015, 4 pages.

"NTLM Overview", retrieved from << https://learn.microsoft.com/en-us/windows-server/security/kerberos/ntlm-overview >>, Sep. 21, 2023, 3 pages.

"Is storing information in RAM more secure than on Disk?", retrieved from << https://security.stackexchange.com/questions/202375/is-storing-information-in-ram-more-secure-than-on-disk >>, Jan. 28, 2019, 2 pages.

"Memory segmentation", retrieved from << https://en.wikipedia.org/wiki/Memory_segmentation >>, Apr. 15, 2024, 6 pages.

"Memory management", retrieved from << https://en.wikipedia.org/wiki/Memory_management >>, Jun. 3, 2024, 8 pages.

"Address space layout randomization", retrieved from << https://en.wikipedia.org/wiki/Address_space_layout_randomization >>, Jun. 7, 2024, 11 pages.

"FIPS 140", retrieved from << https://en.wikipedia.org/wiki/FIPS_140 >>, Jan. 11, 2024, 4 pages.

"ISO/IEC 19790", retrieved from << https://en.wikipedia.org/wiki/ISO/IEC_19790 >>, Dec. 30, 2023, 1 page.

"Domain controller", retrieved from << https://en.wikipedia.org/wiki/Domain_controller >>, Sep. 7, 2023, 2 pages.

"Initial and Pass Through Authentication Using Kerberos V5 and the GSS-API (IAKERB) draft-zhu-ws-kerb-03", retrieved from << https://datatracker.ietf.org/doc/html/draft-zhu-ws-kerb-03 >>, Jul. 9, 2007, 11 pages.

"Software Guard Extensions", retrieved from << https://en.wikipedia.org/wiki/Software_Guard_Extensions >>, May 25, 2024, 7 pages.

"Trusted execution environment", retrieved from << https://en.wikipedia.org/wiki/Trusted_execution_environment >>, Jun. 17, 2024, 11 pages.

"FIDO Alliance", retrieved from << https://en.wikipedia.org/wiki/FIDO_Alliance >>, May 21, 2024, 9 pages.

* cited by examiner

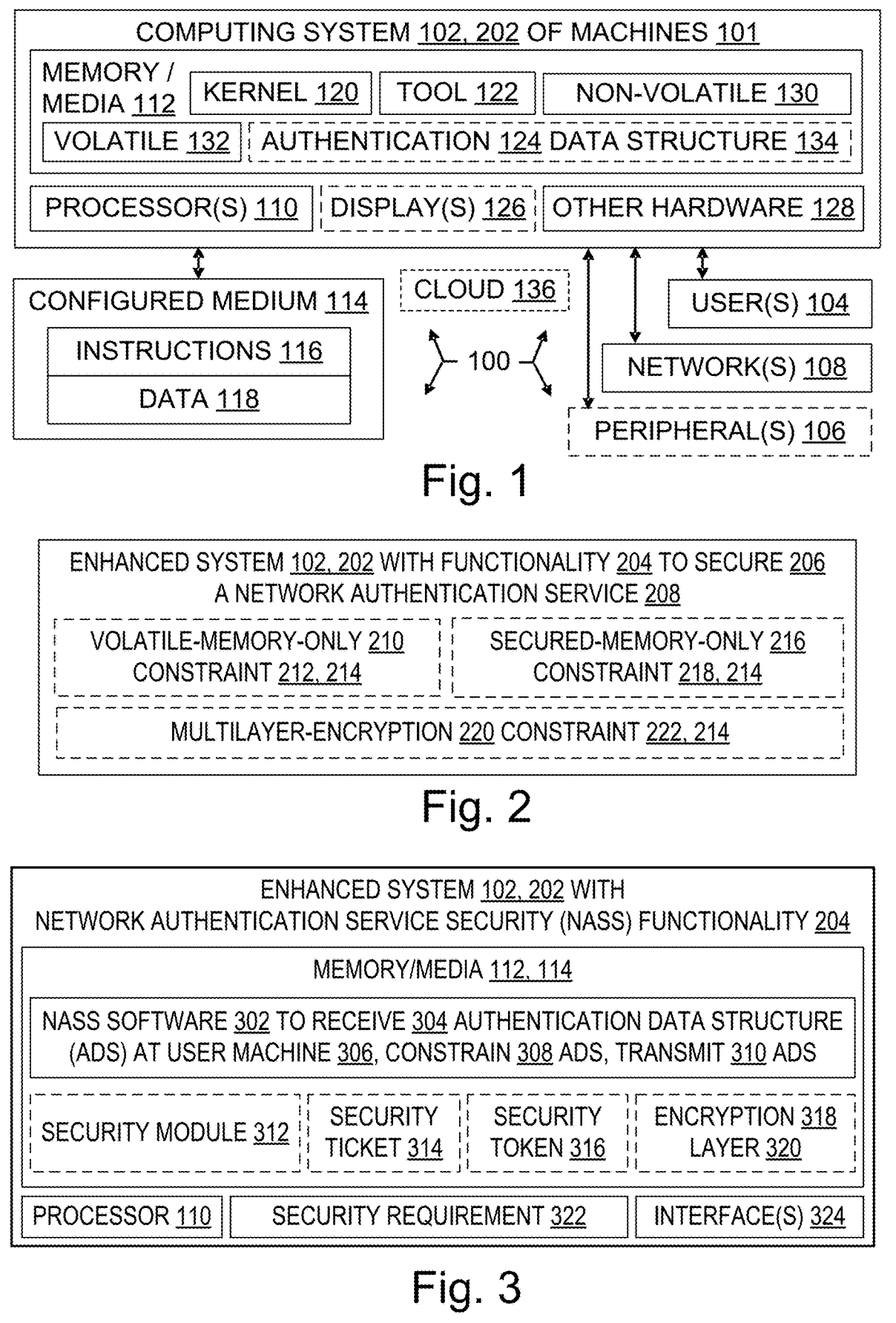

COMPUTING SYSTEM 102, 202 OF MACHINES 101

MEMORY / MEDIA 112 | KERNEL 120 | TOOL 122 | NON-VOLATILE 130

VOLATILE 132 | AUTHENTICATION 124 DATA STRUCTURE 134

PROCESSOR(S) 110 | DISPLAY(S) 126 | OTHER HARDWARE 128

CONFIGURED MEDIUM 114

INSTRUCTIONS 116

DATA 118

CLOUD 136

} 100 {

USER(S) 104

NETWORK(S) 108

PERIPHERAL(S) 106

Fig. 1

ENHANCED SYSTEM 102, 202 WITH FUNCTIONALITY 204 TO SECURE 206
A NETWORK AUTHENTICATION SERVICE 208

VOLATILE-MEMORY-ONLY 210
CONSTRAINT 212, 214

SECURED-MEMORY-ONLY 216
CONSTRAINT 218, 214

MULTILAYER-ENCRYPTION 220 CONSTRAINT 222, 214

Fig. 2

ENHANCED SYSTEM 102, 202 WITH
NETWORK AUTHENTICATION SERVICE SECURITY (NASS) FUNCTIONALITY 204

MEMORY/MEDIA 112, 114

NASS SOFTWARE 302 TO RECEIVE 304 AUTHENTICATION DATA STRUCTURE
(ADS) AT USER MACHINE 306, CONSTRAIN 308 ADS, TRANSMIT 310 ADS

SECURITY MODULE 312 | SECURITY TICKET 314 | SECURITY TOKEN 316 | ENCRYPTION 318 LAYER 320

PROCESSOR 110 | SECURITY REQUIREMENT 322 | INTERFACE(S) 324

Fig. 3

METHOD 600

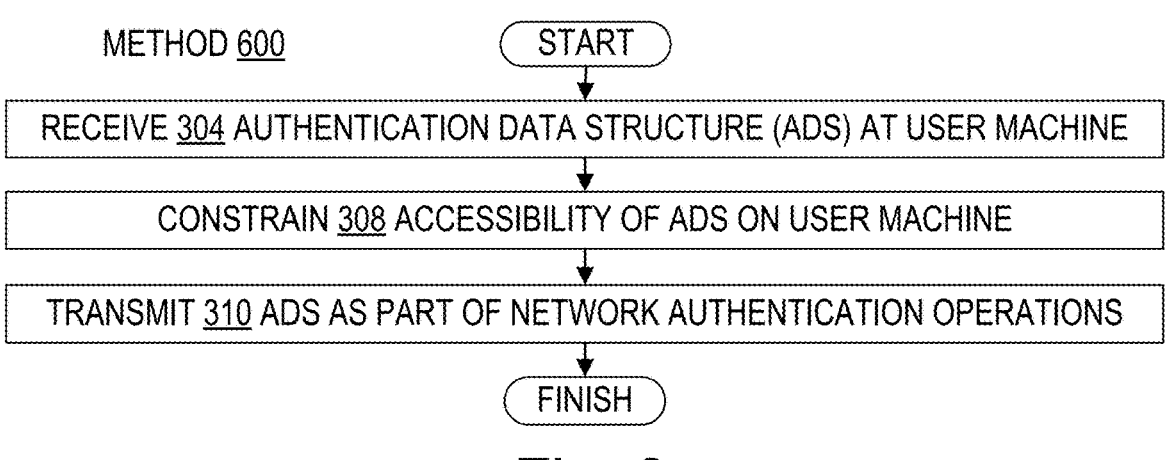

START

RECEIVE 304 AUTHENTICATION DATA STRUCTURE (ADS) AT USER MACHINE

CONSTRAIN 308 ACCESSIBILITY OF ADS ON USER MACHINE

TRANSMIT 310 ADS AS PART OF NETWORK AUTHENTICATION OPERATIONS

FINISH

DISABLE 702 EXPOSURE RISK CAPABILITY

BLOCK / REDIRECT 704 / 706 AUTHENTICATION REQUEST

STORE ONLY 708 IN SPECIFIED LOCATION(S)

RESTRICT 710 MAX NUMBER OF USES

PROVIDE 712 SINGLE SIGN-ON 714

PROVIDE 716 ZERO-TRUST ACCESS 718

COMPLY 720 WITH PROTOCOL

PERFORM 722 NETWORK AUTHENTICATION SERVICE

PREVENT 724 STORAGE OF ADS

STORE 726 DATA

ADD 728 ENCRYPTION LAYER

PREVENT 730 ADS TRANSMISSION

ANY OTHER STEP 732 TAUGHT IN TEXT OR DRAWINGS

Fig. 7

NETWORK AUTHENTICATION SERVICE SECURITY

BACKGROUND

Attacks on a computing system may take many different forms, including some forms which are difficult to predict, and forms which may vary from one situation to another. Accordingly, one of the guiding principles of cybersecurity is "defense in depth". In practice, defense in depth is often pursed by forcing attackers to encounter multiple different kinds of security mechanisms at multiple different locations around or within the computing system. No single security mechanism is able to detect every kind of cyberattack, able to determine the scope of an attack or vulnerability, or able to end every detected cyberattack. But sometimes combining and layering a sufficient number and variety of defenses and investigative tools will prevent an attack, deter an attacker, or at least help limit the scope of harm from an attack or a vulnerability.

To implement defense in depth, cybersecurity professionals consider the different kinds of attacks that could be made against a computing system, and the different vulnerabilities the system may include. They select defenses based on criteria such as: which attacks are most likely to occur, which attacks are most likely to succeed, which attacks are most harmful if successful, which defenses are in place, which defenses could be put in place, and the costs and procedural changes and training involved in putting a particular defense in place or removing a particular vulnerability to attack. They investigate the scope of an attack, and try to detect vulnerabilities before they are exploited in an attack. Some defenses or investigations might not be feasible or cost-effective for the particular computing system. However, improvements in cybersecurity remain possible, and worth pursuing.

SUMMARY

Some embodiments address technical challenges arising in network authentication operations. One challenge is how to increase the security of network authentication operations while complying with standards that specify the content of communications between a user machine and an authentication server and also complying with standards that specify the content of communications between the user machine and a ticket-granting server. Another challenge is how to increase the security of network authentication operations against attacks that gain unauthorized access to a user machine's disk. Another challenge is how to increase the security of network authentication operations against attacks that gain unauthorized access to a domain controller. Other technical challenges are also addressed herein.

Some embodiments taught herein provide or utilize technology which increases the security of network authentication operations, such as Kerberos operations, New Technology LAN Manager (NTLM) operations, or other network authentication operations which utilize security tickets or security tokens or both. In some embodiments, a machine (sometimes called a user machine or a client machine) receives an authentication data structure (ADS) which includes one or more security tickets or security tokens. Embodiments constrain the ADS according to at least one security requirement. Embodiments also transmit the ADS from the machine as a part of performing the network authentication service.

One security requirement in some embodiments is a volatile-memory-only security requirement. Under this security requirement, embodiments constrain the ADS by preventing storage of the ADS in any non-volatile storage of the machine while the ADS resides on the machine. Another security requirement is a secured-memory-only security requirement. Under this security requirement, embodiments constrain the ADS by preventing storage of the ADS in any storage of the machine which is external to a hardware security module storage of the machine while the ADS resides on the machine, or external to a trusted execution environment storage of the machine while the ADS resides on the machine, for example. Yet another security requirement is a multilayer-encryption security requirement. Under this security requirement, embodiments constrain the ADS by adding at least one layer of encryption around the ADS at the machine and also constrain the ADS by preventing transmission of the ADS from the machine unless the ADS is secured within at least two layers of encryption which have different respective keys.

Other technical activities, technical characteristics, and technical benefits pertinent to teachings herein will also become apparent to those of skill in the art. The examples given are merely illustrative. This Summary is not intended to identify key features or essential features of the claimed subject matter, nor is it intended to be used to limit the scope of the claimed subject matter. Rather, this Summary is provided to introduce—in a simplified form—some technical concepts that are further described below in the Detailed Description. Subject matter scope is defined with claims as properly understood, and to the extent this Summary conflicts with the claims, the claims should prevail.

BRIEF DESCRIPTION OF THE DRAWINGS

A more particular description will be given with reference to the attached drawings. These drawings only illustrate selected aspects and thus do not fully determine coverage or scope.

FIG. 1 is a diagram illustrating aspects of computer systems and also illustrating configured storage media, including some aspects generally suitable for embodiments which include or use network authentication service security (NASS) functionality;

FIG. 2 is a block diagram illustrating aspects of a family of enhanced systems which are each configured with NASS functionality;

FIG. 3 is a block diagram illustrating aspects of another family of systems which are each enhanced with NASS functionality, including some systems with NASS software which upon execution performs a family of NASS methods;

FIG. 6 is a flowchart further illustrating the family of NASS methods; and

FIG. 7 is a flowchart further illustrating NASS methods, and incorporating as options the steps of FIGS. 3, 4, and 6.

DETAILED DESCRIPTION

Overview

Figure 4:
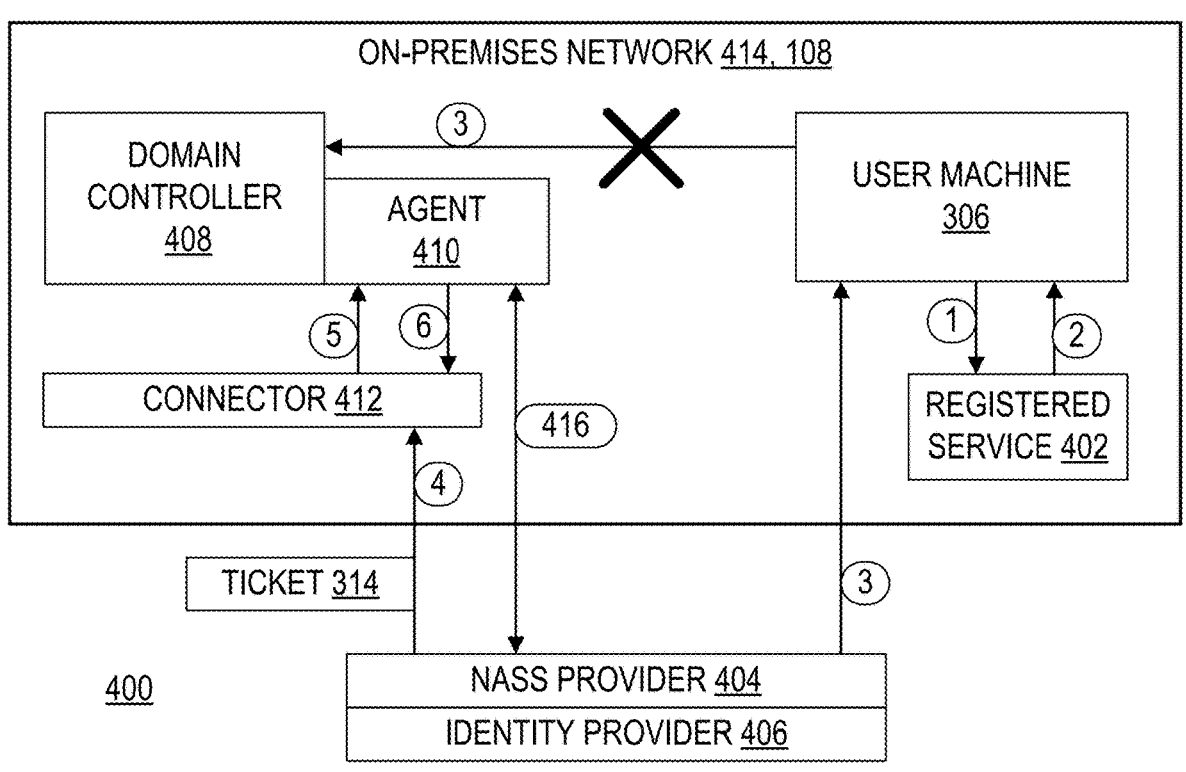
FIG. 4 is a data flow diagram illustrating aspects of NASS functionality in an architecture with a NASS provider located in a cloud outside an on-premises network.

Some teachings described herein were motivated by technical challenges faced and insights gained during efforts to improve technology for network authentication, including Kerberos-based network authentication, for example. These challenges and insights provided some motivations, but the teachings herein are not limited in their scope or applicability to these particular tools, motivational challenges, solutions, or insights.

In some scenarios, network authentication operations which use a Kerberos protocol obtain a ticket-granting ticket (TGT) and a Service Ticket (ST) from a Key Distribution Center (KDC). Often a Domain Controller (DC) serves as the KDC. However, in some scenarios these tickets are written into storage locations that are susceptible to unauthorized access with very little additional effort by an attacker after a machine is compromised. For instance, a machine's local disk or a machine's local (on-device) operating system Kerberos cache can be accessed readily when the machine is compromised. This puts the Kerberos tickets at risk of theft and subsequent misuse.

To address these vulnerabilities, one approach would be to replace Kerberos a more secure protocol. In fact, in some scenarios Kerberos has replaced an arguably less secure NTLM protocol. Teachings herein do not necessarily prevent authentication protocol replacement. However, teachings herein do provide alternative approaches that do not rely on replacing Kerberos, but instead increase network authentication security regardless of whether Kerberos is employed. Thus, network security is increased without incurring the substantial costs and errors likely to occur when swapping one authentication protocol for another authentication protocol. Moreover, these security increases do not conflict with the use of zero-trust network access, or the use of single-sign-on network access, or both.

In some embodiments, cybersecurity is enhanced by ensuring that a security ticket, e.g., a Kerberos ticket, will never be written to disk, but will instead stay only in-memory (meaning only in volatile memory such as RAM), which makes the ticket more secure and averts ticket thefts. Instead of keeping tickets only in volatile memory, or in addition to that precaution, some embodiments manage the ticket lifecycle to make the ticket ephemeral (e.g., single-use), which adds more security to these tickets.

Some embodiments described herein utilize or provide a NASS method, which is performed by a computing system, and which includes constraining an authentication data structure (ADS) according to a security requirement, the constraining including at least one of: (a) according to a volatile-memory-only security requirement, constraining by preventing storage of the ADS in any non-volatile storage of a machine while the ADS resides on the machine, (b) according to a secured-memory-only security requirement, constraining by preventing storage of the ADS in any storage of a machine which is external to a hardware security module storage of the machine while the ADS resides on the machine, or (c) according to a multilayer-encryption security requirement, constraining by adding at least one layer of encryption around the ADS at a machine and also constraining by preventing transmission of the ADS from the machine unless the ADS is secured within at least two layers of encryption which have different respective keys. Some variations utilize a trusted execution environment in addition to, or in place of, the hardware security module. In each case, the ADS is at the machine as part of an authentication which is being performed in response to an access request that was sent from the machine.

This NASS functionality has the technical benefit of improving security by placing the ADS behind one or more technical barriers to unauthorized access.

With respect to volatile-memory-only storage of the ADS, in order to access the ADS an attacker must overcome the difficult technical challenge of locating the ADS in RAM (RAM is an example of volatile memory). Locating a particular data structure in RAM is made difficult by the sheer size of RAM in many machines (billions of bytes), and by the fact that all data and program instructions get translated into ones and zeros for storage in RAM (in some sense, everything in RAM looks alike). Locating the ADS is also made difficult by commonly used mechanisms such as memory address space segmentation, dynamic memory allocation, garbage collection, memory virtualization, and address space layout randomization, which individually and collectively complicate the search for any particular piece of data.

With respect to secured-memory-only storage of the ADS, in order to access the ADS an attacker must overcome the difficult technical challenge of reading data from a security module 312 storage, e.g., a hardware security module storage or a trusted execution environment storage, such as an enclave, or a passkey storage such as a universal serial bus (USB) security token storage. A hardware security module (HSM) 312 is a physical computing device that safeguards data. Often the secured data includes digital keys, but other kinds of data can also be secured in an HSM. An HSM sometimes includes a plug-in card or an external device that attaches directly to a machine. HSMs are tested, validated, and certified to high security standards, such as Federal Information Processing Standard (FIPS) 140-2 or FIPS 140-3 or International Organization for Standardization/ International Electrotechnical Commission (ISO/IEC) 19790:2012. A trusted execution environment (TEE) 312 is a secure area of a processor, which is implemented via security architecture with features including at least: isolated execution, integrity of software applications operating within the TEE, and confidentiality of the assets of such applications. One example of a TEE architecture is the Intel® Software Guard Extensions architecture (a.k.a. Intel SGX™). Other TEE examples include those defined by Open Mobile Terminal Platform (OMTP) standards, Apple® Secure Enclave™ specifications, and IBM® Secure Service Container™ or IBM® Secure Execution™ specifications (marks of their respective owners). Unless expressly stated otherwise, standards referenced herein refer to the version of the standard in effect at the time of filing of the present patent disclosure. Regardless of the particular standard, gaining unauthorized access to data in hardware security module storage is a difficult technical challenge.

With respect to multilayer-encryption of the ADS, in order to access the ADS an attacker must overcome the difficult technical challenge of obtaining a first decryption key, decrypting an encryption layer around the ADS using that first decryption key, obtaining a second decryption key which is different from the first decryption key, and decrypting another encryption layer around the ADS using the second decryption key. In particular, when the keys come from different vaults, two vaults must be compromised in order to compromise the ADS. Because vaults are high-value targets, they are tightly secured. Thus, gaining unauthorized access to a double-encrypted ADS is a difficult technical challenge.

In some embodiments, while the authentication data structure resides on the machine the constraining includes at least one of: disabling a memory dump capability on the machine, or constraining storage of the authentication data structure on the machine to volatile storage of the machine which is external to all memory of the machine which is subject to being dumped proactively and automatically in response to a crash on the machine.

This NASS functionality has the technical benefit of improving security by preventing an attacker from gaining access to the ADS via a memory dump file on disk. Data on disk is generally less secure than data in RAM. For example, kernel controls that inhibit one computational process from reading data stored in the address space of another computational process often do not carry over to protect data that is stored on a hard disk.

In some embodiments, while the authentication data structure resides on the machine the constraining includes at least one of: disabling a virtual memory capability on the machine, or constraining storage of the authentication data structure on the machine to volatile storage of the machine which is external to all memory of the machine which is subject to being swapped proactively and automatically to non-volatile storage by a virtual memory capability of a kernel of the machine.

This NASS functionality has the technical benefit of improving security by preventing an attacker from gaining access to the ADS via a virtual memory swap file on disk. Because virtual memory swap files are sometimes used by multiple computational processes, and because virtual memory mechanisms are often optimized for faster swaps between RAM and hard disk, security measures in place to protect the data in a swap file against unauthorized access are sometimes reduced or even minimized, to provide faster swaps.

In some embodiments, while the authentication data structure resides on the machine the constraining includes at least one of: on the machine, storing the authentication data structure only in one or more locations external to any operating system cache memory of the machine; or on the machine, storing the authentication data structure only in one or more locations external to any Kerberos protocol cache memory of the machine.

This NASS functionality has the technical benefit of improving security by preventing ADS storage in locations that are predictable and relatively easy to identify on the machine.

In some embodiments, wherein the authentication data structure is received at the machine from an off-premises cloud server, the machine being an on-premises machine, the method further includes at least one of: blocking a request, the request being from the machine to an on-premises domain controller, the request requesting the authentication data structure; or redirecting a request to the off-premises cloud server, the request being from the machine and requesting the authentication data structure.

This NASS functionality has the technical benefit of improving security by routing authentication requests to the off-premises cloud server, which then integrates, into authentication operations, one or more security controls that are not implemented by the on-premises domain controller. For example, in some embodiments the off-premises cloud server integrates one or more of: multifactor authentication, conditional access, or zero-trust protocols.

In some embodiments, the authentication data structure is bound by a binding to an identification of the user machine, and the binding includes a digital signature.

This NASS functionality has the technical benefit of improving security by inhibiting an attack which attempts to replay the authentication from a different machine using an unauthorized copy of the ADS. The replay will fail, because the different machine has a different identification than the original authorized machine, and a mismatch with the digital signature will reveal attempts to tamper with the machine identification.

In some embodiments, the network authentication service computing system is configured to restrict use of the authentication data structure to at most one successful use for authentication.

This NASS functionality has the technical benefit of improving security by inhibiting an attack which attempts to replay the authentication, from a different machine or at a different time, or both, using the original ADS or an unauthorized copy of the ADS. The replay will fail, because the ADS is configured to allow at most one successful use for authentication. For example, a bit or other data field in the ADS indicates whether the ADS has been used, and a digital signature protects that ADS data field against tampering. This constraint is a special case, with N equal 1, of a more general constraint in which the number of permitted uses is specified in the ADS as N, N>=1.

These and other benefits will be apparent to one of skill from the teachings provided herein.

Operating Environments

With reference to FIG. 1, an operating environment 100 for an embodiment includes at least one computer system 102. The computer system 102 may be a multiprocessor computer system, or not. An operating environment may include one or more machines in a given computer system, which may be clustered, client-server networked, and/or peer-to-peer networked within a cloud 136. An individual machine is a computer system, and a network or other non-empty group of cooperating machines is also a computer system. A given computer system 102 may be configured for end-users, e.g., with applications, for administrators, as a server, as a distributed processing node, and/or in other ways.

Human users 104 sometimes interact with a computer system 102 user interface by using displays 126, keyboards 106, and other peripherals 106, via typed text, touch, voice, movement, computer vision, gestures, and/or other forms of I/O. Virtual reality or augmented reality or both functionalities are provided by a system 102 in some embodiments. A screen 126 is a removable peripheral 106 in some embodiments and is an integral part of the system 102 in some embodiments. The user interface supports interaction between an embodiment and one or more human users. In some embodiments, the user interface includes one or more of: a command line interface, a graphical user interface (GUI), natural user interface (NUI), voice command interface, or other user interface (UI) presentations, presented as distinct options or integrated.

System administrators, network administrators, cloud administrators, security analysts and other security personnel, operations personnel, developers, testers, engineers, auditors, and end-users are each a particular type of human user 104. In some embodiments, automated agents, scripts, playback software, devices, and the like running or otherwise serving on behalf of one or more humans also have user accounts, e.g., service accounts. Sometimes a user account is created or otherwise provisioned as a human user account but in practice is used primarily or solely by one or more services; such an account is a de facto service account. Although a distinction could be made, "service account" and "machine-driven account" are used interchangeably herein with no limitation to any particular vendor.

The distinction between human-driven accounts and machine-driven accounts is a different distinction than the distinction between attacker-driven accounts and non-attacker driven accounts. A particular human-driven account may be attacker-driven, or non-attacker-driven, at a given point in time. Similarly, a particular machine-driven account may be attacker-driven, or non-attacker-driven, at a given point in time.

Although for convenience, examples and claims herein sometimes speak in terms of accounts, "account" means "account or session or both" unless stated otherwise. In this disclosure, including in the claims and elsewhere, a statement about activity by "the user account or the user session" does not mean that both the user account and the user session must be present. Instead, such a statement is to be understood as a pair of corresponding but distinct statements given as alternatives, one statement being about activity by the user account, and the other statement being about activity by the user session. Likewise, a characterization of "the user account or the user session" does not mean that both the user account and the user session must be present. Instead, such a characterization is to be understood as a pair of corresponding but distinct characterizations given as alternatives, one characterizing the user account, and the other characterizing the user session.

Storage devices or networking devices or both are considered peripheral equipment in some embodiments and part of a system 102 in other embodiments, depending on their detachability from the processor 110. In some embodiments, other computer systems not shown in FIG. 1 interact in technological ways with the computer system 102 or with another system embodiment using one or more connections to a cloud 136 and/or other network 108 via network interface equipment, for example.

Each computer system 102 includes at least one processor 110. The computer system 102, like other suitable systems, also includes one or more computer-readable storage media 112, also referred to as computer-readable storage devices 112. In some embodiments, tools 122 include security tools or software applications, mobile devices 102 or workstations 102 or servers 102, editors, compilers, debuggers and other software development tools, as well as APIs, browsers, or webpages and the corresponding software for protocols such as HTTPS, for example. Files, APIs, endpoints, and other resources may be accessed by an account or non-empty set of accounts, user or non-empty group of users, IP address or non-empty group of IP addresses, or other entity. Access attempts may present passwords, digital certificates, tokens or other types of authentication credentials.

Storage media 112 occurs in different physical types. Some examples of storage media 112 are volatile memory, nonvolatile memory, fixed in place media, removable media, magnetic media, optical media, solid-state media, and other types of physical durable storage media (as opposed to merely a propagated signal or mere energy). In particular, in some embodiments a configured storage medium 114 such as a portable (i.e., external) hard drive, CD, DVD, memory stick, or other removable nonvolatile memory medium becomes functionally a technological part of the computer system when inserted or otherwise installed, making its content accessible for interaction with and use by processor 110. The removable configured storage medium 114 is an example of a computer-readable storage medium 112. Some other examples of computer-readable storage media 112 include built-in RAM, ROM, hard disks, and other memory storage devices which are not readily removable by users 104. For compliance with current United States patent requirements, neither a computer-readable medium nor a computer-readable storage medium nor a computer-readable memory nor a computer-readable storage device is a signal per se or mere energy under any claim pending or granted in the United States.

The storage device 114 is configured with binary instructions 116 that are executable by a processor 110; "executable" is used in a broad sense herein to include machine code, interpretable code, bytecode, and/or code that runs on a virtual machine, for example. The storage medium 114 is also configured with data 118 which is created, modified, referenced, and/or otherwise used for technical effect by execution of the instructions 116. The instructions 116 and the data 118 configure the memory or other storage medium 114 in which they reside; when that memory or other computer readable storage medium is a functional part of a given computer system, the instructions 116 and data 118 also configure that computer system. In some embodiments, a portion of the data 118 is representative of real-world items such as events manifested in the system 102 hardware, product characteristics, inventories, physical measurements, settings, images, readings, volumes, and so forth. Such data is also transformed by backup, restore, commits, aborts, reformatting, and/or other technical operations.

Although an embodiment is described as being implemented as software instructions executed by one or more processors in a computing device (e.g., general purpose computer, server, or cluster), such description is not meant to exhaust all possible embodiments. One of skill will understand that the same or similar functionality can also often be implemented, in whole or in part, directly in hardware logic, to provide the same or similar technical effects. Alternatively, or in addition to software implementation, the technical functionality described herein can be performed, at least in part, by one or more hardware logic components. For example, and without excluding other implementations, some embodiments include one of more of: chiplets, hardware logic components 110, 128 such as Field-Programmable Gate Arrays (FPGAs), Application-Specific Integrated Circuits (ASICs), Application-Specific Standard Products (ASSPs), System-on-a-Chip components, Complex Programmable Logic Devices (CPLDs), and similar components. In some embodiments, components are grouped into interacting functional modules based on their inputs, outputs, or their technical effects, for example.

In addition to processors 110 (e.g., CPUs, ALUs, FPUs, TPUs, GPUs, and/or quantum processors), memory/storage media 112, peripherals 106, and displays 126, some operating environments also include other hardware 128, such as batteries, buses, power supplies, wired and wireless network interface cards, for instance. The nouns "screen" and "display" are used interchangeably herein. In some embodiments, a display 126 includes one or more touch screens, screens responsive to input from a pen or tablet, or screens which operate solely for output. In some embodiments, peripherals 106 such as human user I/O devices (screen, keyboard, mouse, tablet, microphone, speaker, motion sensor, etc.) will be present in operable communication with one or more processors 110 and memory 112.

In some embodiments, the system includes multiple computers connected by a wired and/or wireless network 108. Networking interface equipment 128 can provide access to networks 108, using network components such as a packet-switched network interface card, a wireless transceiver, or a telephone network interface, for example, which are present in some computer systems. In some, virtualizations of networking interface equipment and other network components such as switches or routers or firewalls are also present, e.g., in a software-defined network or a sandboxed or other secure cloud computing environment. In some embodiments, one or more computers are partially or fully "air gapped" by reason of being disconnected or only intermittently connected to another networked device or remote cloud. In particular, NASS functionality 204 could be installed on an air gapped network 108 which includes both (a) an on-premises cloud portion or an off-premises cloud secured at the same or better level as a government cloud, and (b) a non-cloud on-premises network portion, and then be updated periodically or on occasion using removable media 114, or not be updated at all. Some examples of a "government cloud" include Salesforce® Government Cloud implementations at the time of filing of the present disclosure, Microsoft Azure® for US Government implementations at the time of filing of the present disclosure, and Amazon Web Services GovCloud™ implementations at the time of filing of the present disclosure (marks of their respective owners). Some embodiments also communicate technical data or technical instructions or both through direct memory access, removable or non-removable volatile or nonvolatile storage media, or other information storage-retrieval and/or transmission approaches.

One of skill will appreciate that the foregoing aspects and other aspects presented herein under "Operating Environments" form part of some embodiments. This document's headings are not intended to provide a strict classification of features into embodiment and non-embodiment feature sets.

One or more items are shown in outline form in the Figures, or listed inside parentheses, to emphasize that they are not necessarily part of the illustrated operating environment or all embodiments, but interoperate with items in an operating environment or some embodiments as discussed herein. It does not follow that any items which are not in outline or parenthetical form are necessarily required, in any Figure or any embodiment. In particular, FIG. 1 is provided for convenience; inclusion of an item in FIG. 1 does not imply that the item, or the described use of the item, was known prior to the current disclosure.

In any later application that claims priority to the current application, reference numerals may be added to designate items disclosed in the current application. Such items may include, e.g., software, hardware, steps, processes, systems, functionalities, mechanisms, devices, data structures, kinds of data, settings, parameters, components, computational resources, programming languages, tools, workflows, or algorithm implementations, or other items in a computing environment, which are disclosed herein but not associated with a particular reference numeral herein. Corresponding drawings may also be added.

More About Systems

FIG. 2 illustrates a computing system 102 configured by one or more of the NASS functionality enhancements taught herein, resulting in an enhanced system 202. In some embodiments, this enhanced system 202 includes a single machine, a local network of machines, machines in a particular building, machines used by a particular entity, machines in a particular datacenter, machines in a particular cloud, or another computing environment 100 that is suitably enhanced. FIG. 2 items are discussed at various points herein.

FIG. 3 shows some aspects of some enhanced systems 202. Like FIG. 2, FIG. 3 is not a comprehensive summary of all aspects of enhanced systems 202 or all aspects of NASS functionality 204. Nor is either figure a comprehensive summary of all aspects of an environment 100 or system 202 or other context of an enhanced system 202, or a comprehensive summary of any aspect of functionality 204 for potential use in or with a system 102. FIG. 3 items are discussed at various points herein.

FIG. 4 is a data flow diagram illustrating aspects of NASS functionality 204 in an architecture 400 with a NASS provider 404 located in a cloud 136 outside an on-premises network 414. Additional architectures, which are not individually shown in respective dedicated figures, combine or vary features and characteristics shown in one or more figures. In particular, some additional architectures are characterized according to whether the NASS provider is integrated into an identity provider 406, whether a different system than a domain controller 408 is used on-premises as a key distribution center for authentication 124, and whether an agent 410 is an add-on or is instead integrated with the KDC/DC 408.

Figure 5:
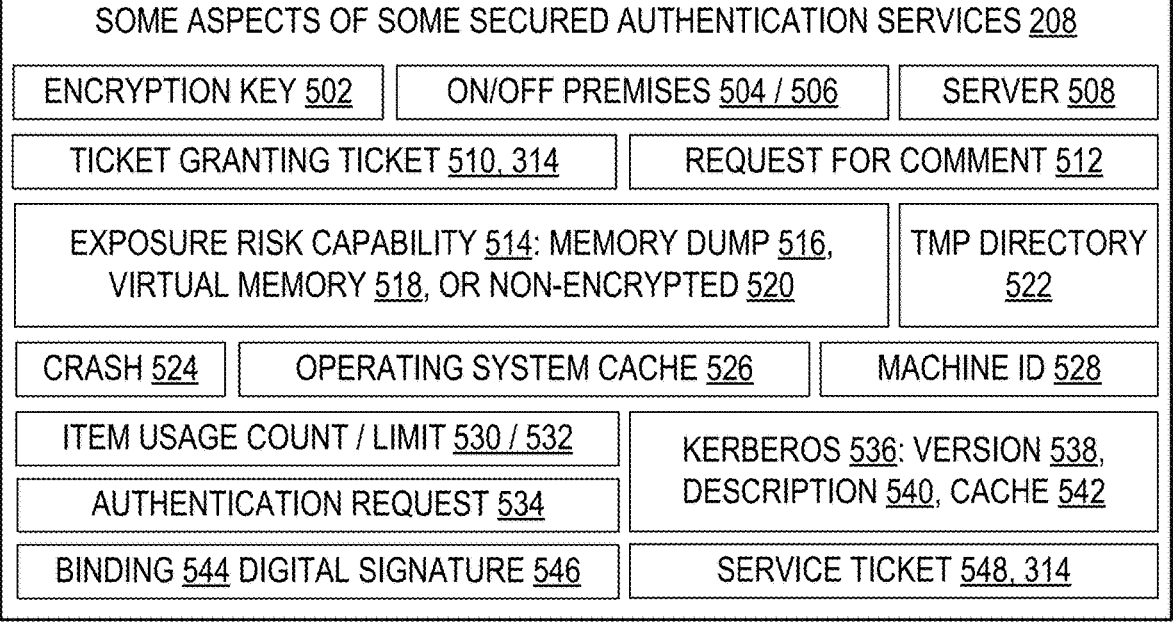
FIG. 5 is a block diagram illustrating aspects of NASS functionality in some scenarios.

FIG. 5 shows some additional aspects related to NASS functionality 204. This is not a comprehensive summary of all aspects of NASS functionality 204. FIG. 5 items are discussed at various points herein.

The other figures are also relevant to systems 202. FIGS. 6 and 7 are flowcharts which illustrate some methods of NASS functionality 204 operation in some systems 202.

In some embodiments, the enhanced system 202 is networked through an interface 324. In some, an interface 324 includes hardware such as network interface cards, software such as network stacks, APIs, or sockets, combination items such as network connections, or a combination thereof.

Some embodiments include a computing system 202 which is configured to utilize or provide NASS functionality 204. The system 202 includes a digital memory set 112 including at least one digital memory 112, and a processor set 110 including at least one processor 110. The processor set is in operable communication with the digital memory set. A digital memory set is a set which includes at least one digital memory 112, also referred to as a memory 112. The word "digital" is used to emphasize that the memory 112 is part of a computing system 102, not a human person's memory. The word "set" is used to emphasize that the memory 112 is not necessarily in a single contiguous block or of a single kind, e.g., a memory 112 may include hard drive memory as well as volatile RAM, and may include memories that are physically located on different machines 101. Similarly, the phrase "processor set" is used to emphasize that a processor 110 is not necessarily confined to a single chip or a single machine 101.

All sets herein are non-empty unless described otherwise.

In this example, a network authentication service computing system 202 includes at least one processor 110 of a user machine 306, 101 which is in operable communication with at least one digital memory; the at least one digital memory includes volatile storage 132 and non-volatile storage 130. The at least one processor 110 is configured to perform a NASS method 700. This method 700 includes receiving 304 an authentication data structure 134 at the user machine, constraining 308 the authentication data structure according to a security requirement 322, and transmitting 310 the authentication data structure from the user machine as a part of performing the network authentication service.

In some embodiments, the user machine also includes or is otherwise characterized by at least one of the following: (a) the security requirement includes a volatile-memory-only 210 security requirement, and the at least one processor is configured to constrain by preventing 724 storage of the authentication data structure in any non-volatile storage of the user machine while the authentication data structure resides on the user machine, (b) the security requirement includes to a secured-memory-only 216 security requirement, the user machine includes a hardware security module 312 or a trusted execution environment 312 having a hardware security module storage or a trusted execution environment storage such as an enclave memory, and the at least one processor is configured to constrain by preventing 724 storage of the authentication data structure external to the hardware security module storage, or external to the trusted execution environment storage, or external to both, while the authentication data structure resides on the user machine, or (c) the security requirement includes a multilayer-encryption 220 security requirement, and the at least one processor is configured to constrain by adding 728 at least one layer 320 of encryption 318 around the authentication data structure at the user machine and also configured to constrain by preventing 730 transmission 310 of the authentication data structure from the user machine unless the authentication data structure is secured 206 within at least two layers of encryption which have different respective keys 502.

Each of (a), (b), and (c) improves security 206 by increasing the difficulty of unauthorized access to the ADS, which improves security in turn by reducing the risk that attackers will obtain valid authentications 124 to access resources in the system 202. In some embodiments the user machine 306 includes or is characterized by at least (a) and (c). In some embodiments the user machine 306 includes or is characterized by at least (b) and (c). In some embodiments the user machine 306 includes or is characterized by (a), (b), and (c).

Storing only 708 is an allow-list approach to controlling ADS storage, whereas preventing 724 is a deny-list approach to controlling ADS storage. However, some embodiments treat these two approaches as functionally interchangeable with respect to their security impact.

In some embodiments, the authentication data structure 134 is bound by a binding 544 to an identification 528 of the user machine, and the binding includes a digital signature 546. This improves security 206 by reducing the risk that the ADS 134 will be used successfully in a replay attack from a different machine than the authorized user machine.

In some embodiments, the network authentication service computing system is configured to restrict 710 use of the authentication data structure 134 to at most one successful use for authentication 124; then re-authentication 124 is required for additional access. In a variation, ADS 134 use is restricted 710 to at most N uses, where $1 <= N <= M$. In some, usage limit M 532 is configurable. In some, $M < 5$. In Kerberos environments, the ticket-granting ticket 510, or the service ticket 548, or both, are use-limited ADSs 134. Use limitation on ADSs improves security by reducing the risk that the ADS 134 will be used successfully in a replay attack, from any machine. This use count restriction is implemented in various ways, depending on the embodiment. In some embodiments, the ADS includes a use maximum, protected by a digital signature against tampering, and the NASS provider or registered service 402 or other actor that is asked to grant access or take other action based on the ADS checks a use counter against the use maximum. The use counter is stored internally in the actor, or in protected memory of the actor that is not readily accessible to the user machine. In some embodiments, the ADS use maximum is the counter, and the counter is decremented with each use and then a new hash or signature or other tamper deterrent value is computed from the updated ADS and stored in the ADS or alongside the ADS.

In some embodiments, the user machine resides on 504 a premises, a domain controller 408 also resides on 504 the premises, and the network authentication service computing system is configured to prohibit direct communication between the user machine and the domain controller by at least one of: blocking 704 any request 534 from the user machine to the domain controller in which the user machine requests the authentication data structure; or redirecting 706 to an off-premises 506 cloud server 508 any request 534 from the user machine to the domain controller in which the user machine requests the authentication data structure.

For example, in FIG. 4 a large X on the horizontal arrow marked with a circled 3 indicates a blocked 704 request 534 or a redirected 706 request 534 from the user machine 306 to the domain controller 408. When a request 534 is blocked, the user machine receives an error message. When a request 534 is redirected, the user machine receives a response from the cloud-resident NASS provider 404, as indicated in FIG. 4 by the vertical marked with a circled 3.

In some embodiments, the network authentication service computing system is configured to provide 712, 716 single-sign-on 714 zero-trust 718 network access. The mechanisms described herein for improving security of an ADS do not interfere with single-sign-on techniques 714, or with zero-trust 718 network access techniques.

In some embodiments, the authentication data structure includes at least one of: a security token 316, or a security ticket 314. Some technical literature treats security tokens as distinct from security tickets, and some technical literature defines one as a subset of the other. However, the present disclosure speaks mainly in terms of the broader category authentication data structures 134. Security tokens 316 and security tickets 314 are examples of authentication data structures 134, and although the distinctions between them are important in some authentication operations, they are both protectable by application of teachings presented herein. The mechanisms described herein for improving security of an ADS are applicable both to tokens and to tickets.

In some embodiments, the authentication data structure 134 includes a ticket 314 which is compliant 720 with at least one version 538 of a Kerberos authentication protocol 536 which is described by a description 540 in an Internet Engineering Task Force (IETF) standard or an IETF request for comments 512, the description published between 2004 and the filing date of the present patent application disclosure. In some embodiments, the authentication data structure 134 includes at least one of: a Kerberos ticket granting ticket 510, or a Kerberos service ticket 548.

Other system embodiments are also described herein, either directly or derivable as system versions of described processes or configured media, duly informed by the extensive discussion herein of computing hardware.

Although specific NASS architecture examples are shown in the Figures, an embodiment may depart from those examples. For instance, items shown in different Figures may be included together in an embodiment, items shown in a Figure may be omitted, functionality shown in different items may be combined into fewer items or into a single item, items may be renamed, or items may be connected differently to one another.

Examples are provided in this disclosure to help illustrate aspects of the technology, but the examples given within this document do not describe all of the possible embodiments. A given embodiment may include additional or different kinds of NASS functionality, for example, as well as different technical features, aspects, interfaces, mechanisms, software, expressions, operational sequences, commands, data structures, programming environments, execution environments, environment or system characteristics, agents, proxies, or other functionality consistent with teachings provided herein, and may otherwise depart from the particular examples provided.

Processes (a.k.a. Methods)

Processes (which are also be referred to as "methods" in the legal sense of that word) are illustrated in various ways herein, both in text and in drawing figures. FIGS. 6 and 7 each illustrate a family of methods 600 and 700 respectively, which are performed or assisted by some enhanced systems, such as some systems 202 or another ESN functionality enhanced system as taught herein. Method family 600 is a proper subset of method family 700. Moreover, activities identified in FIGS. 2, 3, 4, and 5 include explicit or implicit method steps, which are likewise incorporated into method (a.k.a. process) 700. These diagrams and flowcharts are merely examples; as noted elsewhere, any operable combination of steps that are disclosed herein may be part of a given embodiment when called out in a claim.

Technical processes shown in the Figures or otherwise disclosed will be performed automatically, e.g., by an enhanced system 202, unless otherwise indicated. Related non-claimed processes may also be performed in part automatically and in part manually to the extent action by a human person is implicated, e.g., in some situations a human 104 types or speaks an input such as a particular value for a name of a registered service 402. Such input is captured in the system 202 as digital text, or captured as digital audio which is then converted to digital text. Regardless, no process contemplated as an embodiment herein is entirely manual or purely mental; none of the claimed processes can be performed solely in a human mind or on paper. Any claim interpretation to the contrary is squarely at odds with the present disclosure.

In a given embodiment zero or more illustrated steps of a process may be repeated, perhaps with different parameters or data to operate on. Steps in an embodiment may also be done in a different order than the top-to-bottom order that is laid out in FIG. 7. FIG. 7 is a supplemental portion of the textual and figure drawing examples of embodiments provided herein and the descriptions of embodiments provided herein. In the event of any alleged inconsistency, lack of clarity, or excessive breadth due to an interpretation of FIG. 7, the content of this disclosure shall prevail over that interpretation of FIG. 7.

Arrows in process or data flow figures indicate allowable flows; arrows pointing in more than one direction thus indicate that flow may proceed in more than one direction. Steps may be performed serially, in a partially overlapping manner, or fully in parallel within a given flow. In particular, the order in which flowchart 700 action items are traversed to indicate the steps performed during a process may vary from one performance instance of the process to another performance instance of the process. The flowchart traversal order may also vary from one process embodiment to another process embodiment. Steps may also be omitted, combined, renamed, regrouped, be performed on one or more machines, or otherwise depart from the illustrated flow, provided that the process performed is operable and conforms to at least one claim of an application or patent that includes or claims priority to the present disclosure. To the extent that a person of skill considers a given sequence S of steps which is consistent with FIG. 7 to be non-operable, the sequence S is not within the scope of any claim. Any assertion otherwise is contrary to the present disclosure.

Some embodiments provide or utilize a NASS method 700 in a computing system 102, e.g., in a computer network 108. This 700 includes automatically: receiving 304 an authentication data structure 134 at a machine 101 of the computing system 102, the machine having volatile storage 132, 112 and also having non-volatile storage 130, 112; constraining 308 the authentication data structure according to a security requirement 322, the constraining including at least one of: (a) according to a volatile-memory-only 210 security requirement, constraining by preventing 724 storage 726 of the authentication data structure in any non-volatile storage of the machine while the authentication data structure resides on the machine, (b) according to a secured-memory-only 216 security requirement, constraining by preventing 724 storage 726 of the authentication data structure in any storage of the machine which is external to a security module 312 storage of the machine while the authentication data structure resides on the machine, or (c) according to a multilayer-encryption 220 security requirement, constraining by adding 728 at least one layer 320 of encryption 318 around the authentication data structure at the machine and also constraining by preventing 730 transmission 310 of the authentication data structure from the machine unless the authentication data structure is secured 206 within at least two layers of encryption 318 which have different respective keys 502; and transmitting 310 the authentication data structure from the machine as a part of performing 722 the network authentication service 208. Some variations utilize an enclave memory or other trusted execution environment storage, or a protected process (e.g., PPL protected process light) storage, or a protected memory or enclave storage, instead of, or in addition to, the hardware security module storage.

In some embodiments, the network authentication service 208 includes at least one of: a network authentication service 208 which sends the authentication data structure 134 from an off-premises cloud server 508 to the machine 101, the machine being an on-premises machine, and wherein the authentication data structure includes a ticket granting ticket 510; a Kerberos 536 version 5 or later protocol service 208; a service 208 which is compliant 720 with and implements at least a portion of Internet Engineering Task Force (IETF) Request for Comment (RFC) published as RFC 4120; or a service which is compliant with and implements at least a portion of any published draft update to Internet Engineering Task Force Request for Comment 4120 which is published prior to the filing date of the present patent disclosure. Some examples include a data structure described in the RFC 512 or in a published description 540 of the Kerberos version 538, a data exchange described in the RFC or in the Kerberos description, or a data structure or a data exchange which permits Kerberos authentication to complete with the assistance of a proxy, e.g., by supporting client machine 306 with a key distribution center (KDC) using a generic security service (GSS) API acceptor as the proxy. The GSS API acceptor relays the KDC request and reply messages between the client and the KDC. The GSS-API acceptor, when relaying the Kerberos messages, is sometimes called an IAKERB proxy or an IA-KERB proxy, as part of initial and pass-through authentication using Kerberos.

In some embodiments, the constraining includes, at least while the authentication data structure resides on the machine, at least one of: disabling 702 a memory dump capability 516, 514 on the machine; constraining 308 storage of the authentication data structure on the machine to volatile storage of the machine which is external to all memory 112 of the machine which is subject to being dumped proactively and automatically in response to a crash 524 on the machine; disabling 702 a virtual memory capability 518, 514 on the machine; or constraining 308 storage of the authentication data structure on the machine to volatile storage of the machine which is external to all memory of the machine which is subject to being swapped proactively and automatically to non-volatile storage 130 by a virtual memory capability of a kernel of the machine.

Memory dump settings are located in different places in different computing environments, e.g., under menu items or file path identifiers along the lines of "advanced system settings", "startup and recovery", "debugging information", "core dump", "memory dump", "security limits configuration", and so on. Some kernels 120 or system 102 configurations do not support disabling memory dumps.

Virtual memory settings are located in different places in different computing environments, e.g., under menu items or file path identifiers along the lines of "paging file", "memory management", "virtual memory", "swap off", and so on. Some kernels 120 or system 102 configurations do not support disabling virtual memory.

In some embodiments, the constraining includes, at least while the authentication data structure resides on the machine, at least one of: on the machine, storing 708 the authentication data structure only in one or more locations external to any operating system cache 526 memory of the machine; or on the machine, storing 708 the authentication data structure only in one or more locations external to any Kerberos protocol cache 542 memory of the machine.

The operating system cache 526 or Kerberos protocol cache 542 is sometimes referred to as a "credential cache" or a "security cache". On some systems, such a cache is located in a registry, or at a location specified in the registry. On some systems, such a cache is located in a /tmp directory.

In some embodiments, the authentication data structure is received 304 at the machine from an off-premises cloud server 508, the machine being an on-premises machine, and the method further includes at least one of: blocking 704 a request 534, the request being from the machine to an on-premises domain controller 408, the request requesting the authentication data structure; or redirecting 706 a request 534 to the off-premises cloud server, the request being from the machine and requesting the authentication data structure.

Configured Storage Media

Some embodiments include a configured computer-readable storage medium 112. Some examples of storage medium 112 include disks (magnetic, optical, or otherwise), RAM, EEPROMS or other ROMs, and other configurable memory, including in particular computer-readable storage media (which are not mere propagated signals). In some embodiments, the storage medium which is configured is in particular a removable storage medium 114 such as a CD, DVD, or flash memory. A general-purpose memory, which is removable or not, and is volatile or not, depending on the embodiment, can be configured in the embodiment using items such as NASS software 302, security requirements 322 and the constraints 214 that implement them in a particular system 202, and authentication data structures 134, in the form of data 118 and instructions 116, read from a removable storage medium 114 and/or another source such as a network connection, to form a configured storage medium. The foregoing examples are not necessarily mutually exclusive of one another. The configured storage medium 112 is capable of causing a computer system 202 to perform technical process steps for providing or utilizing NASS functionality 204 as disclosed herein. The Figures thus help illustrate configured storage media embodiments and process (a.k.a. method) embodiments, as well as system and process embodiments. In particular, any of the method steps illustrated in FIGS. 6 and 7, or otherwise taught herein, may be used to help configure a storage medium to form a configured storage medium embodiment.

Some embodiments use or provide a computer-readable storage device 112, 114 configured with data 118 and instructions 116 which upon execution by a processor 110 cause a computing system 202 to perform a method 700 of securing a network authentication service, the method performed by a computing system. This method 700 includes: receiving 304 an authentication data structure at a machine of the computing system, the machine having volatile storage and also having non-volatile storage; constraining 308 the authentication data structure according to a security requirement, the constraining including at least one of: (a) according to a volatile-memory-only security requirement, constraining by preventing 724 storage of the authentication data structure in any non-volatile storage of the machine while the authentication data structure resides on the machine, (b) according to a secured-memory-only security requirement, constraining by preventing 724 storage of the authentication data structure in any storage of the machine which is external to a hardware security module storage of the machine while the authentication data structure resides on the machine, or (c) according to a multilayer-encryption security requirement, constraining by adding 728 at least one layer of encryption around the authentication data structure at the machine and also constraining by preventing 730 transmission of the authentication data structure from the machine unless the authentication data structure is secured within at least two layers of encryption which have different respective keys; and transmitting 310 the authentication data structure from the machine as a part of performing 722 the network authentication service. The adding is one way of ensuring 728 the ADS is secured within at least two layers 320 with different respective keys. Reliance on other components of a system 202 outside the machine 306 for such ADS encryption is another way of ensuring 728 the ADS is secured within at least two layers 320 with different respective keys.

In some embodiments, the constraining 308 includes constraining storage of the authentication data structure on the machine by storing 708 the authentication data structure only in one or more locations which are external to any operating system cache memory of the machine and also external to any non-volatile memory of the machine.

In some embodiments, the constraining 308 includes constraining storage of the authentication data structure on the machine by storing 708 the authentication data structure only in one or more locations which are external to any Kerberos protocol cache memory of the machine and also external to any non-volatile memory of the machine.

In some embodiments, the constraining 308 includes constraining storage of the authentication data structure on the machine by storing 708 the authentication data structure only in one or more locations which are external to any tmp directory 522 of the machine and external to any kernel-defined credential cache 526 and also external to any non-volatile memory 130 of the machine.

In some embodiments, the authentication data structure is not stored 726 on the machine as non-encrypted 520 data at any point while the computing system is performing 722 the network authentication service.

Additional Observations

Additional support for the discussion of NASS functionality 204 herein is provided under various headings. However, it is all intended to be understood as an integrated and integral part of the present disclosure's discussion of the contemplated embodiments.

One of skill will recognize that not every part of this disclosure, or any particular details therein, are necessarily required to satisfy legal criteria such as enablement, written description, best mode, novelty, nonobviousness, inventive step, or industrial applicability. Any apparent conflict with any other patent disclosure, even from the owner of the present subject matter, has no role in interpreting the claims presented in this patent disclosure. It is in the context of this understanding, which pertains to all parts of the present disclosure, that examples and observations are offered herein.

An example of the architecture 400 shown in FIG. 4 provides on-premises multifactor authentication using an identity provider 406 such as a Microsoft Entra ID™ identity provider which is enhanced by, or supplemented with, a NASS provider 404 (mark of Microsoft Corporation). In one operational scenario, an on-premises user (that is, a user machine 306) tries to access a service 402 that has been registered with the identity provider 406, e.g., a file share service 402. This access attempt is represented in FIG. 4 by an arrow labeled with a circled 1. In a response represented by an arrow labeled with a circled 2, the service 402 notifies the user machine that the requested access requires a Kerberos service ticket 548.

As indicated by a horizontal arrow labeled with a circled 3, the user machine then sends a request 534 toward a domain controller 408, in pursuit of the service ticket. However, as indicated by the large X on that arrow, the request to the domain controller is redirected 706 to the NASS provider which then responds to the user machine 306, as indicated by a vertical arrow that is also labeled by a circled 3. Direct access to the domain controller by the user machine is thus blocked. In this example, the redirection is performed by an agent 410, 204, but in other configurations the redirection is performed by an enhancement 204 within the domain controller. In some embodiments, even if a request 534 from the user machine 306 reaches the domain controller, the enhanced domain controller or an agent recognizes the request is part of a direct (a.k.a. line-of-sight) communication and denies the request. The resulting denial notification informs the user machine that NTLM may be blocked, for example, because otherwise in some cases the user machine will see only an authentication error and conclude wrongly that credentials were entered incorrectly.

Assuming the request 534 is proper, the NASS provider communicates with other components in order to eventually provide the user machine with the Kerberos ticket 314, as indicated by the arrow labeled by circled 4, and in this example using a connector 412 as indicated by the arrows labeled by circled 5 and circled 6. The arrow label by circled 416 represents a NASS provider data plane 416, suitable for push notifications, for example. In some configurations, the agent 410 includes single-sign-on functionality.

The communications permit the user machine to prove its security posture, e.g., with respect to device compliance, to receive authentication approval, e.g., using a Kerberos or other network authentication protocol. In some embodiments, the NASS provider implements authentication controls not provided by the domain controller, such as conditional access or multifactor authentication controls, or both. The communications establish a trust of the user machine, after which access to the domain controller is allowed. The domain controller validates the user machine's request and provides a Kerberos ticket, which comes via path vertical arrow 3 to an agent on the user machine 306. Then the user machine provides the ticket to the registered service 402, and receives access, e.g., to the file share service 402.

In some embodiments, user traffic to the domain controller is sent via the NASS provider, and the NASS provider to user machine traffic has an encryption layer the domain controller cannot independently decrypt. Decryption is performed via the NASS provider, along paths 3 and 4 in FIG. 4.

Internet of Things

In some embodiments, the system 202 is, or includes, an embedded system such as an Internet of Things system. "IoT" or "Internet of Things" means any networked collection of addressable embedded computing or data generation or actuator nodes. An individual node is referred to as an internet of things device 101 or IoT device 101 or internet of things system 102 or IoT system 102. Such nodes are examples of computer systems 102 as defined herein, and may include or be referred to as a "smart" device, "endpoint", "chip", "label", or "tag", for example, and IoT may be referred to as a "cyber-physical system". In the phrase "embedded system" the embedding referred to is the embedding a processor and memory in a device, not the embedding of debug script in source code.

IoT nodes and systems typically have at least two of the following characteristics: (a) no local human-readable display; (b) no local keyboard; (c) a primary source of input is sensors that track sources of non-linguistic data to be uploaded from the IoT device; (d) no local rotational disk storage—RAM chips or ROM chips provide the only local memory; (e) no CD or DVD drive; (f) being embedded in a household appliance or household fixture; (g) being embedded in an implanted or wearable medical device; (h) being embedded in a vehicle; (i) being embedded in a process automation control system; or (j) a design focused on one of the following: environmental monitoring, civic infrastructure monitoring, agriculture, industrial equipment monitoring, energy usage monitoring, human or animal health or fitness monitoring, physical security, physical transportation system monitoring, object tracking, inventory control, supply chain control, fleet management, or manufacturing. IoT communications may use protocols such as TCP/IP, Constrained Application Protocol (CoAP), Message Queuing Telemetry Transport (MQTT), Advanced Message Queuing Protocol (AMQP), HTTP, HTTPS, Transport Layer Security (TLS), UDP, or Simple Object Access Protocol (SOAP), for example, for wired or wireless (cellular or otherwise) communication. IoT storage or actuators or data output or control may be a target of unauthorized access, either via a cloud, via another network, or via direct local access attempts.

Technical Character

The technical character of embodiments described herein will be apparent to one of ordinary skill in the art, and will also be apparent in several ways to a wide range of attentive readers. Some embodiments address technical activities such as authentication, encryption or decryption, caching, sending and receiving data over a computer network, and storing data in particular kinds of computing system memory, which are each an activity deeply rooted in computing technology. Some of the technical mechanisms discussed include, e.g., NASS software 302, identity providers 406, Kerberos and other protocols for authentication 208, and interfaces 324. Some of the technical effects discussed include, e.g., improved security of Kerberos tickets, improved security of other authentication data structures, and redirection of authentication requests. Thus, purely mental processes and activities limited to pen-and-paper are clearly excluded from the scope of any embodiment. Other advantages based on the technical characteristics of the teachings will also be apparent to one of skill from the description provided.

One of skill understands that network authentication is a technical activity which cannot be performed mentally at all, and cannot be performed manually with the speed and accuracy required in computing systems. Hence, network authentication security improvements such as the various examples of NASS functionality 204 described herein are improvements to computing technology. One of skill understands that attempting to manually secure network authentication data structures would create unacceptable delays in software operation, and introduce unnecessary and unacceptable human errors and security risks. People manifestly lack the speed, accuracy, memory capacity, and specific processing capabilities required to perform network authentication security enhancement as taught herein.

Different embodiments provide different technical benefits or other advantages in different circumstances, but one of skill informed by the teachings herein will acknowledge that particular technical advantages will likely follow from particular embodiment features or feature combinations, as noted at various points herein. Any generic or abstract aspects are integrated into a practical application such as Microsoft Entra™ Private Access or another enhanced identity provider or NASS provider, Microsoft Secure Access Essentials™ tools, or other network authentication support tools (marks of Microsoft Corporation).

Some embodiments described herein may be viewed by some people in a broader context. For instance, concepts such as efficiency, reliability, user satisfaction, or waste may be deemed relevant to a particular embodiment. However, it does not follow from the availability of a broad context that exclusive rights are being sought herein for abstract ideas; they are not.

Rather, the present disclosure is focused on providing appropriately specific embodiments whose technical effects fully or partially solve particular technical problems, such as how to increase the security of network authentication operations while complying with standards that specify the content of communications between a user machine and an authentication server (e.g., by constraining 408 ADS 134 storage on the user machine), how to increase the security of network authentication operations while complying with standards that specify the content of communications between a user machine and a ticket-granting server (e.g., by redirecting communications via a NASS provider), how to increase the security of network authentication operations against attacks that gain unauthorized access to a user machine's disk (e.g., by volatile-memory-only constraints 212 and disabling 702 memory dumping 516 and virtual memory 518), and how to increase the security of network authentication operations against attacks that gain unauthorized access to a domain controller (e.g., by multilayer encryption and redirection via a NASS provider). Other configured storage media, systems, and processes involving efficiency, reliability, user satisfaction, or waste are outside the present scope. Accordingly, vagueness, mere abstractness, lack of technical character, and accompanying proof problems are also avoided under a proper understanding of the present disclosure.

Additional Combinations and Variations

Any of these combinations of software code, data structures, logic, components, communications, and/or their functional equivalents may also be combined with any of the systems and their variations described above. A process may include any steps described herein in any subset or combination or sequence which is operable. Each variant may occur alone, or in combination with any one or more of the other variants. Each variant may occur with any of the processes and each process may be combined with any one or more of the other processes. Each process or combination of processes, including variants, may be combined with any of the configured storage medium combinations and variants described above.

More generally, one of skill will recognize that not every part of this disclosure, or any particular details therein, are necessarily required to satisfy legal criteria such as enablement, written description, or best mode. Also, embodiments are not limited to the particular scenarios, language models, prompts, motivating examples, operating environments, tools, peripherals, software process flows, identifiers, repositories, data structures, data selections, naming conventions, notations, control flows, or other implementation choices described herein. Any apparent conflict with any other patent disclosure, even from the owner of the present subject matter, has no role in interpreting the claims presented in this patent disclosure.

Acronyms, Abbreviations, Names, and Symbols

Some acronyms, abbreviations, names, and symbols are defined below. Others are defined elsewhere herein, or do not require definition here in order to be understood by one of skill.

ALU: arithmetic and logic unit
API: application program interface
BIOS: basic input/output system
CD: compact disc
CLI: command line interface, command line interpreter
CPU: central processing unit
DVD: digital versatile disk or digital video disc
FPGA: field-programmable gate array
FPU: floating point processing unit
GDPR: General Data Protection Regulation
GPU: graphical processing unit
GUI: graphical user interface
HTTPS: hypertext transfer protocol, secure
IaaS or IAAS: infrastructure-as-a-service
IDE: integrated development environment
LAN: local area network
OS: operating system
PaaS or PAAS: platform-as-a-service
RAM: random access memory
ROM: read only memory
SIEM: security information and event management
TPU: tensor processing unit
UEFI: Unified Extensible Firmware Interface
UI: user interface
WAN: wide area network Some Additional Terminology Reference is made herein to exemplary embodiments such as those illustrated in the drawings, and specific language is used herein to describe the same. But alterations and further modifications of the features illustrated herein, and additional technical applications of the abstract principles illustrated by particular embodiments herein, which would occur to one skilled in the relevant art(s) and having possession of this disclosure, should be considered within the scope of the claims.

The meaning of terms is clarified in this disclosure, so the claims should be read with careful attention to these clarifications. Specific examples are given, but those of skill in the relevant art(s) will understand that other examples may also fall within the meaning of the terms used, and within the scope of one or more claims. Terms do not necessarily have the same meaning here that they have in general usage (particularly in non-technical usage), or in the usage of a particular industry, or in a particular dictionary or set of dictionaries. Reference numerals may be used with various phrasings, to help show the breadth of a term. Sharing a reference numeral does not mean necessarily sharing every aspect, feature, or limitation of every item referred to using the reference numeral. Omission of a reference numeral from a given piece of text does not necessarily mean that the content of a Figure is not being discussed by the text. The present disclosure asserts and exercises the right to specific and chosen lexicography. Quoted terms are being defined explicitly, but a term may also be defined implicitly without using quotation marks. Terms may be defined, either explicitly or implicitly, here in the Detailed Description and/or elsewhere in the application file.

A "computer system" (a.k.a. "computing system") may include, for example, one or more servers, motherboards, processing nodes, laptops, tablets, personal computers (portable or not), personal digital assistants, smartphones, smartwatches, smart bands, cell or mobile phones, other mobile devices having at least a processor and a memory, video game systems, augmented reality systems, holographic projection systems, televisions, wearable computing systems, and/or other device(s) providing one or more processors controlled at least in part by instructions. The instructions may be in the form of firmware or other software in memory and/or specialized circuitry.

A "multithreaded" computer system is a computer system which supports multiple execution threads. The term "thread" should be understood to include code capable of or subject to scheduling, and possibly to synchronization. A thread may also be known outside this disclosure by another name, such as "task," "process," or "coroutine," for example. However, a distinction is made herein between threads and processes, in that a thread defines an execution path inside a process. Also, threads of a process share a given address space, whereas different processes have different respective address spaces. The threads of a process may run in parallel, in sequence, or in a combination of parallel execution and sequential execution (e.g., time-sliced).

A "processor" is a thread-processing unit, such as a core in a simultaneous multithreading implementation. A processor includes hardware. A given chip may hold one or more processors. Processors may be general purpose, or they may be tailored for specific uses such as vector processing, graphics processing, signal processing, floating-point arithmetic processing, encryption, I/O processing, machine learning, and so on.

"Kernels" include operating systems, hypervisors, virtual machines, BIOS or UEFI code, and similar hardware interface software.

"Code" means processor instructions, data (which includes constants, variables, and data structures), or both instructions and data. "Code" and "software" are used interchangeably herein. Executable code, interpreted code, and firmware are some examples of code.

"Program" is used broadly herein, to include applications, kernels, drivers, interrupt handlers, firmware, state machines, libraries, and other code written by programmers (who are also referred to as developers) and/or automatically generated.

A "routine" is a callable piece of code which normally returns control to an instruction just after the point in a program execution at which the routine was called. Depending on the terminology used, a distinction is sometimes made elsewhere between a "function" and a "procedure": a function normally returns a value, while a procedure does not. As used herein, "routine" includes both functions and procedures. A routine may have code that returns a value (e.g., sin(x)) or it may simply return without also providing a value (e.g., void functions).

"Service" as a noun means a consumable program offering, in a cloud computing environment or other network or computing system environment, which provides resources to multiple programs or provides resource access to multiple programs, or does both. A service implementation may itself include multiple applications or other programs.

"Cloud" means pooled resources for computing, storage, and networking which are elastically available for measured on-demand service. A cloud may be private, public, community, or a hybrid, and cloud services may be offered in the form of infrastructure as a service (IaaS), platform as a service (PaaS), software as a service (SaaS), or another service. Unless stated otherwise, any discussion of reading from a file or writing to a file includes reading/writing a local file or reading/writing over a network, which may be a cloud network or other network, or doing both (local and networked read/write). A cloud may also be referred to as a "cloud environment" or a "cloud computing environment".

"Access" to a computational resource includes use of a permission or other capability to read, modify, write, execute, move, delete, create, or otherwise utilize the resource. Attempted access may be explicitly distinguished from actual access, but "access" without the "attempted" qualifier includes both attempted access and access actually performed or provided.

Herein, activity by a user refers to activity by a user device or activity by a user account or user session, or by software on behalf of a user, or by hardware on behalf of a user. Activity is represented by digital data or machine operations or both in a computing system. Activity within the scope of any claim based on the present disclosure excludes human actions per se. Software or hardware activity "on behalf of a user" accordingly refers to software or hardware activity on behalf of a user device or on behalf of a user account or a user session or on behalf of another computational mechanism or computational artifact, and thus does not bring human behavior per se within the scope of any embodiment or any claim.

"Digital data" means data in a computing system, as opposed to data written on paper or thoughts in a person's mind, for example. Similarly, "digital memory" refers to a non-living device, e.g., computing storage hardware, not to human or other biological memory.

As used herein, "include" allows additional elements (i.e., includes means comprises) unless otherwise stated.

"Optimize" means to improve, not necessarily to perfect. For example, it may be possible to make further improvements in a program or an algorithm which has been optimized.

"Process" is sometimes used herein as a term of the computing science arts, and in that technical sense encompasses computational resource users, which may also include or be referred to as coroutines, threads, tasks, interrupt handlers, application processes, kernel processes, procedures, or object methods, for example. As a practical matter, a "process" is the computational entity identified by system utilities such as Windows® Task Manager, Linux® ps, or similar utilities in other operating system environments (marks of Microsoft Corporation, Linus Torvalds, respectively). "Process" may also be used as a patent law term of art, e.g., in describing a process claim as opposed to a system claim or an article of manufacture (configured storage medium) claim. Similarly, "method" is used herein primarily as a technical term in the computing science arts (a kind of "routine") but it is also a patent law term of art (akin to a "method"). "Process" and "method" in the patent law sense are used interchangeably herein. Those of skill will understand which meaning is intended in a particular instance, and will also understand that a given claimed process or method (in the patent law sense) may sometimes be implemented using one or more processes or methods (in the computing science sense).

"Automatically" means by use of automation (e.g., general purpose computing hardware configured by software for specific operations and technical effects discussed herein), as opposed to without automation. In particular, steps performed "automatically" are not performed by hand on paper or in a person's mind, although they may be initiated by a human person or guided interactively by a human person. Automatic steps are performed with a machine in order to obtain one or more technical effects that would not be realized without the technical interactions thus provided. Steps performed automatically are presumed to include at least one operation performed proactively.

One of skill understands that technical effects are the presumptive purpose of a technical embodiment. The mere fact that calculation is involved in an embodiment, for example, and that some calculations can also be performed without technical components (e.g., by paper and pencil, or even as mental steps) does not remove the presence of the technical effects or alter the concrete and technical nature of the embodiment, particularly in real-world embodiment implementations. NASS operations such as redirection 706, encryption 318, storage limitations 708 and 724 and 212 and 218, and many other operations discussed herein (whether recited expressly in the Figures or not), are understood to be inherently digital and computational. A human mind cannot interface directly with a CPU or other processor, or with RAM or other digital storage, to read and write the necessary data to perform the NASS steps 700 taught herein even in a hypothetical situation or a prototype situation, much less in an embodiment's real world large computing environment, e.g., an internet-connected environment. This would all be well understood by persons of skill in the art in view of the present disclosure. Moreover, one of skill understands that NASS functionality cannot be implemented merely with conventional tools and steps, because actual implementation requires the use of teachings which were first provided in the present disclosure.

"Computationally" likewise means a computing device (processor plus memory, at least) is being used, and excludes obtaining a result by mere human thought or mere human action alone. For example, doing arithmetic with a paper and pencil is not doing arithmetic computationally as understood herein. Computational results are faster, broader, deeper, more accurate, more consistent, more comprehensive, and/or otherwise provide technical effects that are beyond the scope of human performance alone. "Computational steps" are steps performed computationally. Neither "automatically" nor "computationally" necessarily means "immediately". "Computationally" and "automatically" are used interchangeably herein.

"Proactively" means without a direct request from a user, and indicates machine activity rather than human activity.

Indeed, a user may not even realize that a proactive step by an embodiment was possible until a result of the step has been presented to the user. Except as otherwise stated, any computational and/or automatic step described herein may also be done proactively.

"Based on" means based on at least, not based exclusively on. Thus, a calculation based on X depends on at least X, and may also depend on Y.

Throughout this document, use of the optional plural "(s)", "(es)", or "(ies)" means that one or more of the indicated features is present. For example, "processor(s)" means "one or more processors" or equivalently "at least one processor".

"At least one" of a list of items means one of the items, or two of the items, or three of the items, and so on up to and including all N of the items, where the list is a list of N items. The presence of an item in the list does not require the presence of the item (or a check for the item) in an embodiment. For instance, if an embodiment of a system is described herein as including at least one of A, B, C, or D, then a system that includes A but does not check for B or C or D is an embodiment, and so is a system that includes A and also includes B but does not include or check for C or D. Similar understandings pertain to items which are steps or step portions or options in a method embodiment. This is not a complete list of all possibilities; it is provided merely to aid understanding of the scope of "at least one" that is intended herein.

For the purposes of United States law and practice, use of the word "step" herein, in the claims or elsewhere, is not intended to invoke means-plus-function, step-plus-function, or 35 United State Code Section 112 Sixth Paragraph/Section 112(f) claim interpretation. Any presumption to that effect is hereby explicitly rebutted.

For the purposes of United States law and practice, the claims are not intended to invoke means-plus-function interpretation unless they use the phrase "means for". Claim language intended to be interpreted as means-plus-function language, if any, will expressly recite that intention by using the phrase "means for". When means-plus-function interpretation applies, whether by use of "means for" and/or by a court's legal construction of claim language, the means recited in the specification for a given noun or a given verb should be understood to be linked to the claim language and linked together herein by virtue of any of the following: appearance within the same block in a block diagram of the figures, denotation by the same or a similar name, denotation by the same reference numeral, a functional relationship depicted in any of the figures, a functional relationship noted in the present disclosure's text. For example, if a claim limitation recited a "zac widget" and that claim limitation became subject to means-plus-function interpretation, then at a minimum all structures identified anywhere in the specification in any figure block, paragraph, or example mentioning "zac widget", or tied together by any reference numeral assigned to a zac widget, or disclosed as having a functional relationship with the structure or operation of a zac widget, would be deemed part of the structures identified in the application for zac widgets and would help define the set of equivalents for zac widget structures.

One of skill will recognize that this disclosure discusses various data values and data structures, and recognize that such items reside in a memory (RAM, disk, etc.), thereby configuring the memory. One of skill will also recognize that this disclosure discusses various algorithmic steps which are to be embodied in executable code in a given implementation, and that such code also resides in memory, and that it effectively configures any general-purpose processor which executes it, thereby transforming it from a general-purpose processor to a special-purpose processor which is functionally special-purpose hardware.

Accordingly, one of skill would not make the mistake of treating as non-overlapping items (a) a memory recited in a claim, and (b) a data structure or data value or code recited in the claim. Data structures and data values and code are understood to reside in memory, even when a claim does not explicitly recite that residency for each and every data structure or data value or piece of code mentioned. Accordingly, explicit recitals of such residency are not required. However, they are also not prohibited, and one or two select recitals may be present for emphasis, without thereby excluding all the other data values and data structures and code from residency. Likewise, code functionality recited in a claim is understood to configure a processor, regardless of whether that configuring quality is explicitly recited in the claim.

Throughout this document, unless expressly stated otherwise any reference to a step in a process presumes that the step may be performed directly by a party of interest and/or performed indirectly by the party through intervening mechanisms and/or intervening entities, and still lie within the scope of the step. That is, direct performance of the step by the party of interest is not required unless direct performance is an expressly stated requirement. For example, a computational step on behalf of a party of interest, such as adding, blocking, complying, constraining, disabling, ensuring, performing, preventing, providing, receiving, redirecting, restricting, storing, transmitting (and adds, added, blocks, blocked, etc.) with regard to a destination or other subject may involve intervening action, such as the foregoing or such as forwarding, copying, uploading, downloading, encoding, decoding, compressing, decompressing, encrypting, decrypting, authenticating, invoking, and so on by some other party or mechanism, including any action recited in this document, yet still be understood as being performed directly by or on behalf of the party of interest. Example verbs listed here may overlap in meaning or even be synonyms; separate verb names do not dictate separate functionality in every case.

Whenever reference is made to data or instructions, it is understood that these items configure a computer-readable memory and/or computer-readable storage medium, thereby transforming it to a particular article, as opposed to simply existing on paper, in a person's mind, or as a mere signal being propagated on a wire, for example. For the purposes of patent protection in the United States, a memory or other storage device or other computer-readable storage medium is not a propagating signal or a carrier wave or mere energy outside the scope of patentable subject matter under United States Patent and Trademark Office (USPTO) interpretation of the In re Nuijten case. No claim covers a signal per se or mere energy in the United States, and any claim interpretation that asserts otherwise in view of the present disclosure is unreasonable on its face. Unless expressly stated otherwise in a claim granted outside the United States, a claim does not cover a signal per se or mere energy.

Moreover, notwithstanding anything apparently to the contrary elsewhere herein, a clear distinction is to be understood between (a) computer readable storage media and computer readable memory, on the one hand, and (b) transmission media, also referred to as signal media, on the other hand. A transmission medium is a propagating signal or a carrier wave computer readable medium. By contrast, computer readable storage media and computer readable memory and computer readable storage devices are not propagating signal or carrier wave computer readable media. Unless expressly stated otherwise in the claim, "computer readable medium" means a computer readable storage medium, not a propagating signal per se and not mere energy.

An "embodiment" herein is an example. The term "embodiment" is not interchangeable with "the invention". Embodiments may freely share or borrow aspects to create other embodiments (provided the result is operable), even if a resulting combination of aspects is not explicitly described per se herein. Requiring each and every permitted combination to be explicitly and individually described is unnecessary for one of skill in the art, and would be contrary to policies which recognize that patent specifications are written for readers who are skilled in the art. Formal combinatorial calculations and informal common intuition regarding the number of possible combinations arising from even a small number of combinable features will also indicate that a large number of aspect combinations exist for the aspects described herein. Accordingly, requiring an explicit recitation of each and every combination would be contrary to policies calling for patent specifications to be concise and for readers to be knowledgeable in the technical fields concerned.

Some terms are hyphenated herein, but alternate hyphenations or non-hyphenated versions will be understood by one of skill to refer to the same thing. For example, "ticket granting ticket" and "ticket-granting ticket" refer to the same items 510. Similarly, "non-encrypted" and "nonencrypted" are interchangeable. Likewise, "multilayer encryption", "multilayer-encryption", and "multi-layer encryption" are interchangeable. These examples are not comprehensive.

Remarks Regarding Reference Numerals

Reference numerals are provided for convenience and in support of the drawing figures and as part of the text of the specification, which collectively describe aspects of embodiments by reference to multiple items. Items which do not have a unique reference numeral may nonetheless be part of a given embodiment. For better legibility of the text, a given reference numeral is recited near some, but not all, recitations of the referenced item in the text. The same reference numeral may be used with reference to different examples or different instances of a given item.

The following remarks pertain to particular reference numerals:

100 operating environment, also referred to as computing environment; includes one or more systems 102

101 machine in a system 102, e.g., any device having at least a processor 110 and having a distinct identifier such as an IP address or a MAC (media access control) address; may be a physical machine or be a virtual machine implemented on physical hardware 102 computer system, also referred to as a "computational system" or "computing system", and when in a network may be referred to as a "node"

104 users, e.g., user of an enhanced system 202

106 peripheral device 108 network generally, including, e.g., LANs, WANs, software-defined networks, clouds, and other wired or wireless networks 110 processor or non-empty set of processors; includes hardware 112 computer-readable storage medium, e.g., RAM, hard disks; also referred to as storage device 114 removable configured computer-readable storage medium 116 instructions executable with processor; may be on removable storage media or in other memory (volatile or nonvolatile or both)

118 digital data in a system 102; data structures, values, source code, and other examples are discussed herein 120 kernel(s), e.g., operating system(s), BIOS, UEFI, device drivers; also refers to an execution engine such as a language runtime 122 software tools, software applications, security controls; hardware tools; computational 126 display screens, also referred to as "displays"

128 computing hardware not otherwise associated with a reference numeral 106, 108, 110, 112, 114

136 cloud, also referred to as cloud environment or cloud computing environment 202 enhanced computing system, i.e., system 102 enhanced with functionality 204 as taught herein 204 network authentication service security functionality (also referred to as NASS functionality 204, or functionality 204, or enhancement 204), e.g., software or specialized hardware which performs or is configured to perform steps 308 and 310, or steps 702 and 310, or steps 706 and 722, or steps 708 and 722, or steps 724 and 722, or any software or hardware which performs or is configured to perform a network authentication security enhancement activity first disclosed herein, or to perform a novel method 700 first disclosed herein 600 flowchart; 600 also refers to NASS methods that are illustrated by or consistent with the FIG. 6 flowchart or any variation of the FIG. 6 flowchart described herein; all NASS method steps are computational, not human activity 700 flowchart; 700 also refers to NASS methods that are illustrated by or consistent with the FIG. 7 flowchart, which incorporates the FIG. 6 flowchart, the steps in FIGS. 2, 3, 4, and 5, and all other steps taught herein, or methods that are illustrated by or consistent with any variation of the FIG. 7 flowchart described herein; all NASS method steps are computational, not human activity 732 any step or item discussed in the present disclosure that has not been assigned some other reference numeral; 732 may thus be shown expressly as a reference numeral for various steps or items or both, and may be added as a reference numeral (in the current disclosure or any subsequent patent application which claims priority to the current disclosure) for various steps or items or both without thereby adding new matter

CONCLUSION

Some embodiments provide or utilize NASS functionality 204 which increases the security of network authentication operations, such as Kerberos 536 operations, New Technology LAN Manager operations, or other network authentication operations 208 which utilize security tickets 314 or security tokens 316 or both. In some embodiments, a user machine 306 (also known as a client machine 306) receives 304 an authentication data structure (ADS) 134 which includes one or more security tickets or security tokens or both. Embodiments constrain 308 the ADS according to at least one security requirement 322, using a volatile-memory-only constraint 212, a secured-memory-only constraint 218, or a multilayer-encryption constraint 222.

Embodiments also transmit 310 the ADS from the machine as a part of performing the network authentication service 208. Some embodiments inhibit 702 virtual memory 518, or inhibit 702 memory dumping 516, or both. Some embodiments bind 544 the ADS to the user machine 306, and some embodiments limit 710 ADS usage counts 530.

Embodiments are understood to also themselves include or benefit from tested and appropriate security controls and privacy controls such as the General Data Protection Regulation (GDPR). Use of the tools and techniques taught herein can be used together with such controls.

Although Microsoft technology is used in some motivating examples, the teachings herein are not limited to use in technology supplied or administered by Microsoft. Under a suitable license, for example, the present teachings could be embodied in software or services provided by other cloud service providers.

Although particular embodiments are expressly illustrated and described herein as processes, as configured storage media, or as systems, it will be appreciated that discussion of one type of embodiment also generally extends to other embodiment types. For instance, the descriptions of processes in connection with the Figures also help describe configured storage media, and help describe the technical effects and operation of systems and manufactures like those discussed in connection with other Figures. It does not follow that any limitations from one embodiment are necessarily read into another. In particular, processes are not necessarily limited to the data structures and arrangements presented while discussing systems or manufactures such as configured memories.

Those of skill will understand that implementation details may pertain to specific code, such as specific thresholds, comparisons, specific kinds of platforms or programming languages or architectures, specific scripts or other tasks, and specific computing environments, and thus need not appear in every embodiment. Those of skill will also understand that program identifiers and some other terminology used in discussing details are implementation-specific and thus need not pertain to every embodiment. Nonetheless, although they are not necessarily required to be present here, such details may help some readers by providing context and/or may illustrate a few of the many possible implementations of the technology discussed herein.

With due attention to the items provided herein, including technical processes, technical effects, technical mechanisms, and technical details which are illustrative but not comprehensive of all claimed or claimable embodiments, one of skill will understand that the present disclosure and the embodiments described herein are not directed to subject matter outside the technical arts, or to any idea of itself such as a principal or original cause or motive, or to a mere result per se, or to a mental process or mental steps, or to a business method or prevalent economic practice, or to a mere method of organizing human activities, or to a law of nature per se, or to a naturally occurring thing or process, or to a living thing or part of a living thing, or to a mathematical formula per se, or to isolated software per se, or to a merely conventional computer, or to anything wholly imperceptible or any abstract idea per se, or to insignificant post-solution activities, or to any method implemented entirely on an unspecified apparatus, or to any method that fails to produce results that are useful and concrete, or to any preemption of all fields of usage, or to any other subject matter which is ineligible for patent protection under the laws of the jurisdiction in which such protection is sought or is being licensed or enforced.

Reference herein to an embodiment having some feature X and reference elsewhere herein to an embodiment having some feature Y does not exclude from this disclosure embodiments which have both feature X and feature Y, unless such exclusion is expressly stated herein. All possible negative claim limitations are within the scope of this disclosure, in the sense that any feature which is stated to be part of an embodiment may also be expressly removed from inclusion in another embodiment, even if that specific exclusion is not given in any example herein. The term "embodiment" is merely used herein as a more convenient form of "process, system, article of manufacture, configured computer readable storage medium, and/or other example of the teachings herein as applied in a manner consistent with applicable law." Accordingly, a given "embodiment" may include any combination of features disclosed herein, provided the embodiment is consistent with at least one claim.

Not every item shown in the Figures need be present in every embodiment. Conversely, an embodiment may contain item(s) not shown expressly in the Figures. Although some possibilities are illustrated here in text and drawings by specific examples, embodiments may depart from these examples. For instance, specific technical effects or technical features of an example may be omitted, renamed, grouped differently, repeated, instantiated in hardware and/or software differently, or be a mix of effects or features appearing in two or more of the examples. Functionality shown at one location may also be provided at a different location in some embodiments; one of skill recognizes that functionality modules can be defined in various ways in a given implementation without necessarily omitting desired technical effects from the collection of interacting modules viewed as a whole. Distinct steps may be shown together in a single box in the Figures, due to space limitations or for convenience, but nonetheless be separately performable, e.g., one may be performed without the other in a given performance of a method.

Reference has been made to the figures throughout by reference numerals. Any apparent inconsistencies in the phrasing associated with a given reference numeral, in the figures or in the text, should be understood as simply broadening the scope of what is referenced by that numeral. Different instances of a given reference numeral may refer to different embodiments, even though the same reference numeral is used. Similarly, a given reference numeral may be used to refer to a verb, a noun, and/or to corresponding instances of each, e.g., a processor 110 may process 110 instructions by executing them.

As used herein, terms such as "a", "an", and "the" are inclusive of one or more of the indicated item or step. In particular, in the claims a reference to an item generally means at least one such item is present and a reference to a step means at least one instance of the step is performed. Similarly, "is" and other singular verb forms should be understood to encompass the possibility of "are" and other plural forms, when context permits, to avoid grammatical errors or misunderstandings.

Headings are for convenience only; information on a given topic may be found outside the section whose heading indicates that topic.

All claims and the abstract, as filed, are part of the specification. The abstract is provided for convenience and for compliance with patent office requirements; it is not a substitute for the claims and does not govern claim interpretation in the event of any apparent conflict with other parts of the specification. Similarly, the summary is provided for convenience and does not govern in the event of any conflict with the claims or with other parts of the specification. Claim interpretation shall be made in view of the specification as understood by one of skill in the art; it is not required to recite every nuance within the claims themselves as though no other disclosure was provided herein.

To the extent any term used herein implicates or otherwise refers to an industry standard, and to the extent that applicable law requires identification of a particular version of such as standard, this disclosure shall be understood to refer to the most recent version of that standard which has been published in at least draft form (final form takes precedence if more recent) as of the earliest priority date of the present disclosure under applicable patent law.

While exemplary embodiments have been shown in the drawings and described above, it will be apparent to those of ordinary skill in the art that numerous modifications can be made without departing from the principles and concepts set forth in the claims, and that such modifications need not encompass an entire abstract concept. Although the subject matter is described in language specific to structural features and/or procedural acts, it is to be understood that the subject matter defined in the appended claims is not necessarily limited to the specific technical features or acts described above the claims. It is not necessary for every means or aspect or technical effect identified in a given definition or example to be present or to be utilized in every embodiment. Rather, the specific features and acts and effects described are disclosed as examples for consideration when implementing the claims.

All changes which fall short of enveloping an entire abstract idea but come within the meaning and range of equivalency of the claims are to be embraced within their scope to the full extent permitted by law.

What is claimed is:

1. A method of securing a network authentication service, the method performed by a computing system, the method comprising:
   receiving an authentication data structure at a machine of the computing system, the machine having volatile storage and also having non-volatile storage;
   constraining the authentication data structure according to a security requirement, the constraining comprising at least one of: (a) according to a volatile-memory-only security requirement, constraining by preventing storage of the authentication data structure in any non-volatile storage of the machine while the authentication data structure resides on the machine, (b) according to a secured-memory-only security requirement, constraining by preventing storage of the authentication data structure in any storage of the machine which is external to a security module storage of the machine while the authentication data structure resides on the machine, or (c) according to a multilayer-encryption security requirement, constraining by preventing transmission of the authentication data structure from the machine unless the authentication data structure is secured within at least two layers of encryption which have different respective keys; and
   transmitting the authentication data structure from the machine as a part of performing the network authentication service.

2. The method of claim 1, wherein the network authentication service comprises at least one of:
   a network authentication service which sends the authentication data structure from an off-premises cloud server to the machine, the machine being an on-premises machine, and wherein the authentication data structure comprises a ticket granting ticket;

a Kerberos version 5 or later protocol service;

a service which is compliant with and implements at least a portion of Internet Engineering Task Force Request for Comment 4120; or a service which is compliant with and implements at least a portion of any published draft update to Internet Engineering Task Force Request for Comment 4120 which is published prior to the filing date of the present patent disclosure.

3. The method of claim 1, wherein the constraining comprises, at least while the authentication data structure resides on the machine, at least one of:

disabling a memory dump capability on the machine;

constraining storage of the authentication data structure on the machine to volatile storage of the machine which is external to all memory of the machine which is subject to being dumped proactively and automatically in response to a crash on the machine;

disabling a virtual memory capability on the machine; or constraining storage of the authentication data structure on the machine to volatile storage of the machine which is external to all memory of the machine which is subject to being swapped proactively and automatically to non-volatile storage by a virtual memory capability of a kernel of the machine.

4. The method of claim 1, wherein the constraining comprises, at least while the authentication data structure resides on the machine, at least one of:

on the machine, storing the authentication data structure only in one or more locations external to any operating system cache memory of the machine; or on the machine, storing the authentication data structure only in one or more locations external to any Kerberos protocol cache memory of the machine.

5. The method of claim 1, wherein the authentication data structure is received at the machine from an off-premises cloud server, the machine being an on-premises machine, and the method further comprises at least one of:

blocking a request, the request being from the machine to an on-premises domain controller, the request requesting the authentication data structure; or redirecting a request to the off-premises cloud server, the request being from the machine and requesting the authentication data structure.

6. A network authentication service computing system comprising a user machine, the user machine comprising:

a digital memory comprising volatile storage and non-volatile storage;

at least one processor in operable communication with the at least one digital memory, the at least one processor configured to execute a network authentication service security method, the method comprising: receiving an authentication data structure at the user machine, constraining the authentication data structure according to a security requirement, and transmitting the authentication data structure from the user machine as a part of performing the network authentication service;

the user machine also comprising at least one of:

(a) the security requirement comprises a volatile-memory-only security requirement, and the at least one processor is configured to constrain by preventing storage of the authentication data structure in any non-volatile storage of the user machine while the authentication data structure resides on the user machine, or (b) the security requirement comprises to a secured-memory-only security requirement, the user machine comprises a security module having a security module storage, and the at least one processor is configured to constrain by preventing storage of the authentication data structure external to the security module storage while the authentication data structure resides on the user machine.

7. The network authentication service computing system of claim 6, wherein the authentication data structure is bound by a binding to an identification of the user machine, and the binding comprises a digital signature.

8. The network authentication service computing system of claim 6, wherein the network authentication service computing system is configured to restrict use of the authentication data structure to at most one successful use for authentication.

9. The network authentication service computing system of claim 6, wherein the user machine resides on a premises, a domain controller also resides on the premises, and the network authentication service computing system is configured to prohibit direct communication between the user machine and the domain controller by at least one of:

blocking any request from the user machine to the domain controller in which the user machine requests the authentication data structure; or redirecting to an off-premises cloud server any request from the user machine to the domain controller in which the user machine requests the authentication data structure.

10. The network authentication service computing system of claim 9, wherein the network authentication service computing system is configured to provide single-sign-on zero-trust network access.

11. The network authentication service computing system of claim 6, wherein the authentication data structure comprises at least one of: a security token, or a security ticket.

12. The network authentication service computing system of claim 6, wherein the authentication data structure comprises a ticket which is compliant with at least one version of a Kerberos authentication protocol which is described by a description in an Internet Engineering Task Force standard or an Internet Engineering Task Force request for comments, the description published between 2004 and the filing date of the present patent application disclosure.

13. The network authentication service computing system of claim 6, wherein the authentication data structure comprises at least one of: a Kerberos ticket granting ticket, or a Kerberos service ticket.

14. The network authentication service computing system of claim 6, wherein the user machine comprises (a).

15. The network authentication service computing system of claim 6, wherein the user machine comprises (b).

16. A computer-readable storage medium configured with data and instructions which upon execution by a processor perform a method of securing a network authentication service, the method performed by a computing system, the method comprising:

receiving an authentication data structure at a machine of the computing system, the machine having volatile storage and also having non-volatile storage;

constraining the authentication data structure according to a security requirement, the constraining comprising: (a) according to a volatile-memory-only security requirement, constraining by preventing storage of the authentication data structure in any non-volatile storage of the machine while the authentication data structure resides on the machine, (b) according to a secured-memory-only security requirement, constraining by preventing storage of the authentication data structure in any storage of the machine which is external to a security module storage of the machine while the authentication data structure resides on the machine, and (c) according to a multilayer-encryption security requirement, constraining by ensuring the authentication data structure is secured within at least two layers of encryption which have different respective keys; and transmitting the authentication data structure from the machine as a part of performing the network authentication service.

17. The computer-readable storage medium of claim 16, wherein the constraining comprises constraining storage of the authentication data structure on the machine by storing the authentication data structure only in one or more locations which are external to any operating system cache memory of the machine and also external to any non-volatile memory of the machine.

18. The computer-readable storage medium of claim 16, wherein the constraining comprises constraining storage of the authentication data structure on the machine by storing the authentication data structure only in one or more locations which are external to any Kerberos protocol cache memory of the machine and also external to any non-volatile memory of the machine.

19. The computer-readable storage medium of claim 16, wherein the constraining comprises constraining storage of the authentication data structure on the machine by storing the authentication data structure only in one or more locations which are external to any tmp directory of the machine and external to any kernel-defined credential cache and also external to any non-volatile memory of the machine.

20. The computer-readable storage medium of claim 16, wherein the authentication data structure is not stored on the machine as non-encrypted data at any point while the computing system is performing the network authentication service.

* * * * *